(12) United States Patent
Hongu et al.

(10) Patent No.: US 6,829,743 B1
(45) Date of Patent: Dec. 7, 2004

(54) METHOD OF ACQUIRING ENVIRONMENT CONSIDERATION CONDITION INFORMATION

(75) Inventors: Akinori Hongu, Fujisawa (JP);
Kazuhito Haruki, Yokohama (JP);
Miho Takahashi, Yokohama (JP);
Hideki Shimada, Kawasaki (JP);
Kazuhiko Nishimura, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 458 days.

(21) Appl. No.: 09/635,129

(22) Filed: Aug. 9, 2000

(30) Foreign Application Priority Data

Sep. 28, 1999 (JP) .......................................... 11-274706

(51) Int. Cl.[7] .............................................. G06F 17/00
(52) U.S. Cl. ...................................... 715/503; 715/509
(58) Field of Search ................................ 715/503, 504; 705/10, 28, 29; 700/106

(56) References Cited

U.S. PATENT DOCUMENTS

| | | | | |
|---|---|---|---|---|
| 5,652,708 A | * | 7/1997 | Miyamoto | 700/106 |
| 5,768,129 A | * | 6/1998 | Miyamoto | 702/1 |
| 5,852,560 A | * | 12/1998 | Takeyama et al. | 700/97 |
| 5,878,433 A | * | 3/1999 | Miyamoto | 707/103 R |
| 5,963,919 A | * | 10/1999 | Brinkley et al. | 705/28 |
| 6,205,365 B1 | * | 3/2001 | Inada | 700/96 |
| 6,249,714 B1 | * | 6/2001 | Hocaoglu et al. | 700/97 |
| 6,424,969 B1 | * | 7/2002 | Gruenwald | 707/3 |
| 6,490,565 B1 | * | 12/2002 | Beldock | 705/1 |
| 6,490,569 B1 | * | 12/2002 | Grune et al. | 705/400 |

FOREIGN PATENT DOCUMENTS

JP 10-312417 11/1998

OTHER PUBLICATIONS

Jorge L. Alvarado et al., "Microelectronics design for pollution prevention: a decision tradeoff tool", Proceedings of the 1998 IEEE International Symposium on Electronics and the Environment, May 1998, pp. 292–29.*

LauraMaery Gold et al., The Complete Idiot's Guide to Microsoft Excel 97 (2nd Ed., AlphaBooks: 1998) pp. 73–85.*

Thomas Chester et al., Mastering Excel97 (Sybex, Inc.: 1997), pp. 737–738.*

Mahesh C. Gupta, "Environmental Management and Its Impact on the Operations Function", International Journal of Operations & Production Management, vol. 15, No. 8 (1995), pp. 34–51.*

Joseph Sarkis et al., "Greening the Manufacturing Function", Business Horizons, vol. 38, No. 5 (1995), pp. 17–27.*

S. Ching et al., "Application of a Comprehensive Product Environmental Profile System to Design for the Environment", Proceedings of the 1999 IEEE International Symposium on Electronics and the Environment, published May 1999, pp. 82–86.*

* cited by examiner

Primary Examiner—Sanjiv Shah
(74) Attorney, Agent, or Firm—Oblon, Spivak, McClelland, Maier & Neustadt, P.C.

(57) ABSTRACT

Supplier-specific data of material items are extracted from data of various material items used for the manufacture of a product. Tabular data having a structure that allows various pieces of environment consideration condition information about the extracted data to be input is created by using general-purpose spreadsheet software. The tabular data is laid out to locate an item whose contents are likely to change at an end of a table so as to minimize a change in data structure in the event of a change in contents of environment consideration condition items. The tabular data is provided to the supplier. Environment consideration condition information about each material item is acquired by using the tabular data containing the environment consideration condition information added to the tabular data on the supplier side.

16 Claims, 26 Drawing Sheets

[GOOD EXAMPLE]

| COMPANY NAME | PROCUREMENT PARTS | PARTS NAME | CHECK | COMPANY PARTS CODE | DEPARTMENT NAME | NAME OF OPERATOR |
|---|---|---|---|---|---|---|
| *** CORPORATION | BSM30-1234 | POWER UNIT | EXAMPLE | AB1234 | *** DESIGN DEPARTMENT | **** |
| ○○ FACTORY | 12345A8789 | CONNECTOR | | YK94J251K | ELECTRONIC PART DESIGN DEPARTMENT | SHIRO TANAKA |
| ○○ FACTORY | 13341A9696 | CHIP CAPACITOR | | CC2012J47 | ELECTRONIC PART DESIGN DEPARTMENT | SHIRO TANAKA |
| ○○ FACTORY | 10120A2323 | MODULE FRAME | | FLM2323A1 | ELECTRONIC PART DESIGN DEPARTMENT | SHIRO TANAKA |
| ○○ FACTORY | 14126A4126 | DIP SW | | SW-D-8DN | ELECTRONIC PART DESIGN DEPARTMENT | SHIRO TANAKA |
| ○○ FACTORY | 13343A4911 | CHOKE COIL | | HL11-223H | ELECTRONIC PART DESIGN DEPARTMENT | SHIRO TANAKA |
| ○○ FACTORY | 13320A2222 | TRANSFORMER | | TRX2299-A | ELECTRONIC PART DESIGN DEPARTMENT | SHIRO TANAKA |
| ○○ FACTORY | 13352A2500 | I/O UNIT | | CAS-U-103 | MATERIAL DEPARTMENT | GORO INOUE |
| ○○ FACTORY | 15750A2357 | CASE | | TRH1T2S7N | MATERIAL DEPARTMENT | GORO INOUE |

FIG. 4A

FIG. 4B (1) QUALITY (2) RECYCLABILITY

| MASS (g) | RECYCLABLE PORTION 1 | | RECYCLABLE PORTION 2 | | RECYCLABLE PORTION 3 | | RECYCLABLE PORTION 4 | | RECYCLABLE PORTION 5 | |
|---|---|---|---|---|---|---|---|---|---|---|
| | WHAT? | MASS (%) | WHAT? | MASS (%) | WHAT? | MASS (%) | WHAT? | MASS (%) | WHAT? | MASS (%) |
| 2000 | CHASSIS | 30 | TRANS-FORMER | 12 | | | | | | |
| 1000 | | | | | | | | | | |
| 2000 | | | | | | | | | | |
| 20000 | | | FRAME PLATE | 15 | | | | | | |
| 1500 | | | | | | | | | | |
| 500 | | | | | | | | | | |
| 1000 | COPPER WIRE | 40 | | | | | | | | |
| 1500 | | | | | | | | | | |
| 3500 | CHASSIS | 85 | | | | | | | | |

| (3) USE OF RECYCLE MATERIAL | | | | | | | | | | | (4) ENVIRONMENT-RELATED SUBSTANCE | | |
|---|---|---|---|---|---|---|---|---|---|---|---|---|---|
| RECYCLE MATERIAL 1 | | RECYCLE MATERIAL 2 | | RECYCLE MATERIAL 3 | | RECYCLE MATERIAL 4 | | RECYCLE MATERIAL 5 | | ASBESTOS | CADMIUM AND ITS COMPOUNDS | CHRYSOTILE | CYAN COMPOUND |
| WHAT? | MASS (%) | WHAT? | MASS (%) | WHAT? | MASS (%) | WHAT? | MASS (%) | WHAT? | MASS (%) | MASS (%) | MASS (%) | MASS (%) | MASS (%) |
| PVC | 0.02 | | | | | | | | | | | | |
| PP | 15 | | | | | | | | | | | | |

(continued columns: LEAD AND ITS COMPOUNDS — MASS (%) = 0.03; ARSENIC AND ITS COMPOUNDS — MASS (%); FLUORINE COMPOUND (INORGANIC) — MASS (%))

FIG. 4C

[AFTER CHANGE IN GOOD EXAMPLE]

| COMPANY NAME | PROCUREMENT PARTS | PARTS NAME | CHECK | COMPANY PARTS CODE | DEPARTMENT NAME | NAME OF OPERATOR |
|---|---|---|---|---|---|---|
| *** CORPORATION | BSM30-1234 | POWER UNIT | EXAMPLE | AB1234 | *** DESIGN DEPARTMENT | **** |
| ○○ FACTORY | 12345A8789 | CONNECTOR | | YK94J251K | ELECTRONIC PART DESIGN DEPARTMENT | SHIRO TANAKA |
| ○○ FACTORY | 13341A9696 | CHIP CAPACITOR | | CC2012J47 | ELECTRONIC PART DESIGN DEPARTMENT | SHIRO TANAKA |
| ○○ FACTORY | 10120A2323 | MODULE FRAME | | FLM2323A1 | ELECTRONIC PART DESIGN DEPARTMENT | SHIRO TANAKA |
| ○○ FACTORY | 14126A4126 | DIP SW | | SW-D-8DN | ELECTRONIC PART DESIGN DEPARTMENT | SHIRO TANAKA |
| ○○ FACTORY | 13343A4911 | CHOKE COIL | | HL11-223H | ELECTRONIC PART DESIGN DEPARTMENT | SHIRO TANAKA |
| ○○ FACTORY | 13320A2222 | TRANSFORMER | | TRX2299-A | ELECTRONIC PART DESIGN DEPARTMENT | SHIRO TANAKA |
| ○○ FACTORY | 13352A2500 | I/O UNIT | | CAS-U-103 | MATERIAL DEPARTMENT | GORO INOUE |
| ○○ FACTORY | 15750A2357 | CASE | | TRH1T2S7N | MATERIAL DEPARTMENT | GORO INOUE |

FIG. 5A

(1) QUALITY (2) RECYCLABILITY

| MASS (g) | RECYCLABLE PORTION 1 | | RECYCLABLE PORTION 2 | | RECYCLABLE PORTION 3 | | RECYCLABLE PORTION 4 | | RECYCLABLE PORTION 5 | |
|---|---|---|---|---|---|---|---|---|---|---|
| | WHAT? | MASS (%) | WHAT? | MASS (%) | WHAT? | MASS (%) | WHAT? | MASS (%) | WHAT? | MASS (%) |
| 2000 | CHASSIS | 30 | TRANS-FORMER | 12 | | | | | | |
| 1000 | | | | | | | | | | |
| 2000 | | | | | | | | | | |
| 20000 | | | FRAME PLATE | 15 | | | | | | |
| 1500 | | | | | | | | | | |
| 500 | | | | | | | | | | |
| 1000 | COPPER WIRE | 40 | | | | | | | | |
| 1500 | | | | | | | | | | |
| 3500 | CHASSIS | 85 | | | | | | | | |

FIG. 5B

| (3) USE OF RECYCLE MATERIAL | | | | | | | | | | (4) ENVIRONMENT-RELATED SUBSTANCE | | | | | | | |
|---|---|---|---|---|---|---|---|---|---|---|---|---|---|---|---|---|---|
| RECYCLE MATERIAL 1 | | RECYCLE MATERIAL 2 | | RECYCLE MATERIAL 3 | | RECYCLE MATERIAL 4 | | RECYCLE MATERIAL 5 | | ASBESTOS | CADMIUM AND ITS COMPOUNDS | CHRYSOTILE | CYAN COMPOUND | LEAD AND ITS COMPOUNDS | ARSENIC AND ITS COMPOUNDS | FLUORINE COMPOUND (INORGANIC) | ZINC COMPOUND |
| WHAT? | MASS (%) | WHAT? | MASS (%) | WHAT? | MASS (%) | WHAT? | MASS (%) | WHAT? | MASS (%) | MASS (%) | MASS (%) | MASS (%) | MASS (%) | MASS (%) | MASS (%) | MASS (%) | MASS (%) |
| PVC | 0.02 | | | | | | | | | | | | | 0.03 | | | |
| PP | 15 | | | | | | | | | | | | | | | | |

FIG. 5C

[BAD EXAMPLE]

| COMPANY NAME | PROCUREMENT PARTS | PARTS NAME | CHECK | COMPANY PARTS CODE | DEPARTMENT NAME | NAME OF OPERATOR |
|---|---|---|---|---|---|---|
| *** CORPORATION | BSM30-1234 | POWER UNIT | EXAMPLE | AB1234 | *** DESIGN DEPARTMENT | **** |
| ○○ FACTORY | 12345A8789 | CONNECTOR | | YK94J251K | ELECTRONIC PART DESIGN DEPARTMENT | SHIRO TANAKA |
| ○○ FACTORY | 13341A9696 | CHIP CAPACITOR | | CC2012J47 | ELECTRONIC PART DESIGN DEPARTMENT | SHIRO TANAKA |
| ○○ FACTORY | 10120A2323 | MODULE FRAME | | FLM2323A1 | ELECTRONIC PART DESIGN DEPARTMENT | SHIRO TANAKA |
| ○○ FACTORY | 14126A4126 | DIP SW | | SW-D-8DN | ELECTRONIC PART DESIGN DEPARTMENT | SHIRO TANAKA |
| ○○ FACTORY | 13343A4911 | CHOKE COIL | | HL11-223H | ELECTRONIC PART DESIGN DEPARTMENT | SHIRO TANAKA |
| ○○ FACTORY | 13320A2222 | TRANSFORMER | | TRX2299-A | ELECTRONIC PART DESIGN DEPARTMENT | SHIRO TANAKA |
| ○○ FACTORY | 13352A2500 | I/O UNIT | | CAS-U-103 | MATERIAL DEPARTMENT | GORO INOUE |
| ○○ FACTORY | 15750A2357 | CASE | | TRH1T2S7N | MATERIAL DEPARTMENT | GORO INOUE |

FIG. 6A

| 8 | 9 | | | | | | |
|---|---|---|---|---|---|---|---|
| (1) QUALITY | (2) ENVIRONMENT-RELATED SUBSTANCE | | | | | | |
| MASS | ASBESTOS | CADMIUM AND ITS COMPOUNDS | CHRYSOTILE | CYAN COMPOUND | LEAD AND ITS COMPOUNDS | ARSENIC AND ITS COMPOUNDS | FLUORINE COMPOUND (INORGANIC) |
| (g) | MASS (%) | MASS (%) | MASS (%) | MASS (%) | MASS (%) | MASS (%) | MASS (%) |
| 2000 | | | | | | | |
| 1000 | | | | | 0.03 | | |
| 2000 | | | | | | | |
| 20000 | | | | | | | |
| 1500 | | | | | | | |
| 500 | | | | | | | |
| 1000 | | | | | | | |
| 1500 | | | | | | | |
| 3500 | | | | | | | |

| (3) RECYCLABILITY | | | | | | | | | | (4) USE OF RECYCLE MATERIAL | | | | | | | | | |
|---|---|---|---|---|---|---|---|---|---|---|---|---|---|---|---|---|---|---|---|
| RECYCLABLE PORTION 1 | | RECYCLABLE PORTION 2 | | RECYCLABLE PORTION 3 | | RECYCLABLE PORTION 4 | | RECYCLABLE PORTION 5 | | RECYCLE MATERIAL 1 | | RECYCLE MATERIAL 2 | | RECYCLE MATERIAL 3 | | RECYCLE MATERIAL 4 | | RECYCLE MATERIAL 5 | |
| WHAT? | MASS (%) | WHAT? | MASS (%) | WHAT? | MASS (%) | WHAT? | MASS (%) | WHAT? | MASS (%) | MASS | (%) | MASS | (%) | MASS | (%) | MASS | (%) | MASS | (%) |
| CHASSIS | 30 | TRANS-FORMER | 12 | | | | | | | | | | | | | | | | |
| | | FRAME PLATE | 15 | | | | | | | PVC (0.02 | | | | | | | | | |
| | | | | | | | | | | PP | 15 | | | | | | | | |
| COPPER WIRE | 40 | | | | | | | | | | | | | | | | | | |
| CHASSIS | 85 | | | | | | | | | | | | | | | | | | |

[AFTER CHANGE IN BAD EXAMPLE]

| COMPANY NAME | PROCUREMENT PARTS | PARTS NAME | CHECK | COMPANY PARTS CODE | DEPARTMENT NAME | NAME OF OPERATOR |
|---|---|---|---|---|---|---|
| *** CORPORATION | BSM30-1234 | POWER UNIT | EXAMPLE | AB1234 | *** DESIGN DEPARTMENT | **** |
| ○○ FACTORY | 12345A8789 | CONNECTOR | | YK94J251K | ELECTRONIC PART DESIGN DEPARTMENT | SHIRO TANAKA |
| ○○ FACTORY | 13341A9696 | CHIP CAPACITOR | | CC2012J47 | ELECTRONIC PART DESIGN DEPARTMENT | SHIRO TANAKA |
| ○○ FACTORY | 10120A2323 | MODULE FRAME | | FLM2323A1 | ELECTRONIC PART DESIGN DEPARTMENT | SHIRO TANAKA |
| ○○ FACTORY | 14126A4126 | DIP SW | | SW-D-8DN | ELECTRONIC PART DESIGN DEPARTMENT | SHIRO TANAKA |
| ○○ FACTORY | 13343A4911 | CHOKE COIL | | HL11-223H | ELECTRONIC PART DESIGN DEPARTMENT | SHIRO TANAKA |
| ○○ FACTORY | 13320A2222 | TRANSFORMER | | TRX2299-A | ELECTRONIC PART DESIGN DEPARTMENT | SHIRO TANAKA |
| ○○ FACTORY | 13352A2500 | I/O UNIT | | CAS-U-103 | MATERIAL DEPARTMENT | GORO INOUE |
| ○○ FACTORY | 15750A2357 | CASE | | TRH1T2S7N | MATERIAL DEPARTMENT | GORO INOUE |

FIG. 7A

| (1)QUALITY | (2)ENVIRONMENT-RELATED SUBSTANCE | | | | | | |
|---|---|---|---|---|---|---|---|
| MASS | ASBESTOS | CADMIUM AND ITS COMPOUNDS | CHRYSOTILE | CYAN COMPOUND | LEAD AND ITS COMPOUNDS | ARSENIC AND ITS COMPOUNDS | FLUORINE COMPOUND (INORGANIC) |
| (g) | MASS (%) | MASS (%) | MASS (%) | MASS (%) | MASS (%) | MASS (%) | MASS (%) |
| 2000 | | | | | 0.03 | | |
| 1000 | | | | | | | |
| 2000 | | | | | | | |
| 20000 | | | | | | | |
| 1500 | | | | | | | |
| 500 | | | | | | | |
| 1000 | | | | | | | |
| 1500 | | | | | | | |
| 3500 | | | | | | | |

FIG. 7B

| 17 | | | | | | | | | | | 27 | | | | | | | | | |
|---|---|---|---|---|---|---|---|---|---|---|---|---|---|---|---|---|---|---|---|---|
| (3) RECYCLABILITY | | | | | | | | | | | (4) USE OF RECYCLE MATERIAL | | | | | | | | | |
| RECYCLABLE PORTION 1 | | RECYCLABLE PORTION 2 | | RECYCLABLE PORTION 3 | | RECYCLABLE PORTION 4 | | RECYCLABLE PORTION 5 | | | RECYCLE MATERIAL 1 | | RECYCLE MATERIAL 2 | | RECYCLE MATERIAL 3 | | RECYCLE MATERIAL 4 | | RECYCLE MATERIAL 5 | |
| WHAT? | MASS (%) | WHAT? | MASS (%) | WHAT? | MASS (%) | WHAT? | MASS (%) | WHAT? | MASS (%) | | MASS (%) | MASS (%) | MASS (%) | MASS (%) | MASS (%) | MASS (%) | MASS (%) | MASS (%) | MASS (%) | MASS (%) |
| CHAS-SIS | 30 | TRANS-FORMER | 12 | | | | | | | | PVC 0.02 | | | | | | | | | |
| | | FRAME PLATE | 15 | | | | | | | | | | PP 15 | | | | | | | |
| COPPER WIRE | 40 | | | | | | | | | | | | | | | | | | | |
| CHAS-SIS | 85 | | | | | | | | | | | | | | | | | | | |

FIG. 7C

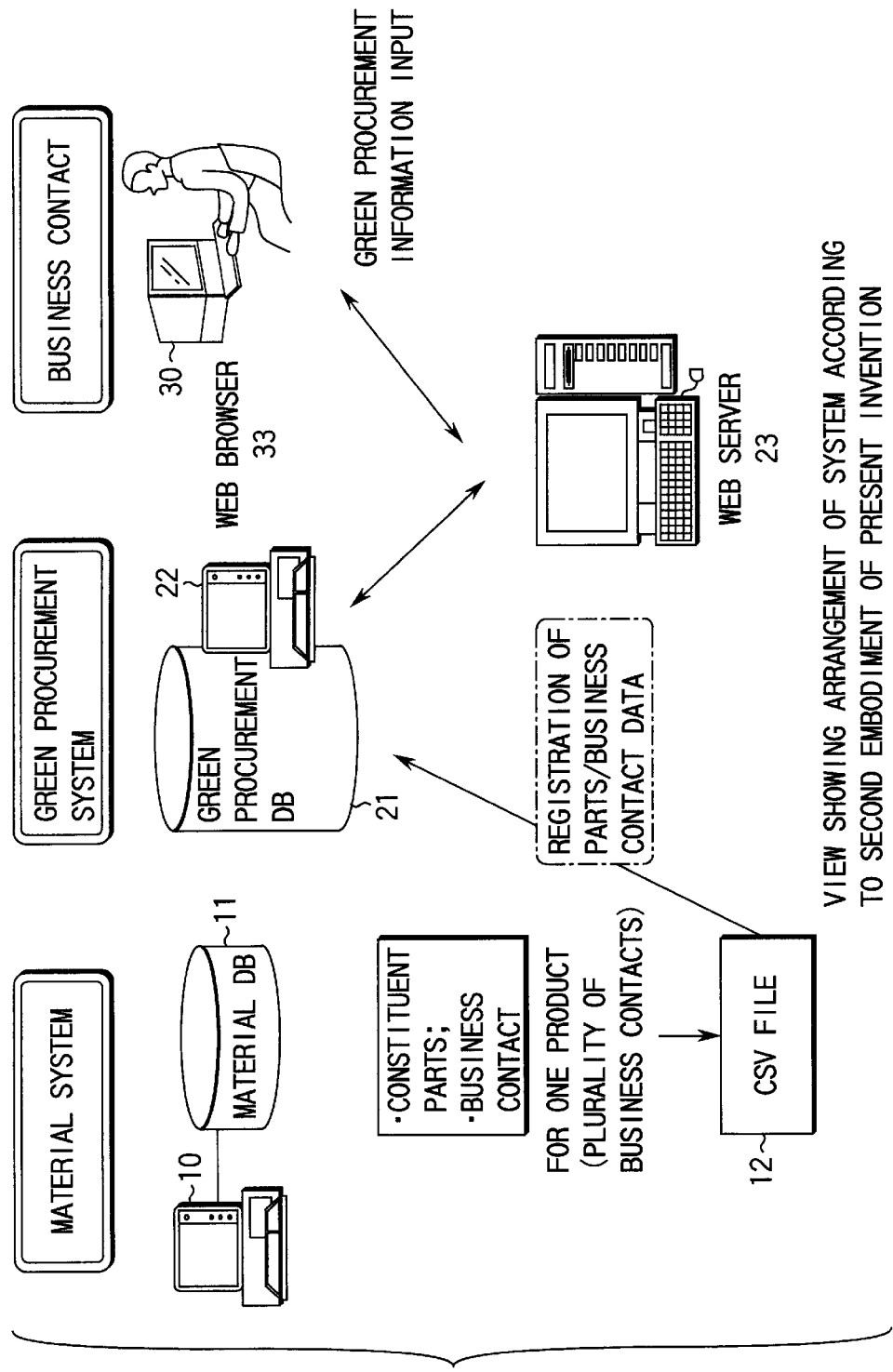
FIG. 8 VIEW SHOWING ARRANGEMENT OF SYSTEM ACCORDING TO SECOND EMBODIMENT OF PRESENT INVENTION

■COMPARISON BETWEEN PERIODS OF TIME REQUIRED FOR PROCESSING

TOTAL NUMBER OF PARTS　　　　　　　　100.000
NUMBER OF SELLERS　　　　　　　　　　　1.000
MAXIMUM NUMBER OF PARTS IN ONE SELLER　3,000

| | CONVENTIONAL METHOD (ENTERING ANSWERS IN SURVEY TABLES ON SHEETS OF PAPER, CONVERTING ANSWERS INTO ELECTRONIC DATA, AND STORING DATA IN DB) | METHOD OF PRESENT INVENTION |
|---|---|---|
| SURVEY DOCUMENT PREPARATION | IT TAKES ABOUT 1 MIN TO PRINT DATA ON ONE SHEET; 1,000 (SELLERS)×1(MIN)= 1,000(MIN) | IT TAKES ABOUT 30 SEC PER SHEET; 1,000 (SELLERS)×30 (SEC)=ABOUT 500(MIN) |
| SURVEY DOCUMENT DELIVERY | SELLERS MUST BE SENT FOR AT SCHEDULED TIMES TO HAND SURVEY DOCUMENTS TO THEM; ABOUT 5 DAYS | SURVEY DOCUMENTS CAN BE DELIVERED BY ELECTRONIC MAIL; 1,000(SELLERS)×3 (SEC)=ABOUT 50(MIN), PROVIDED IT TAKES 3 SEC TO TRANSMIT ONE PIECE OF ELECTRONIC MAIL |
| DATA INPUT BY SELLERS | SELLER HAVING MANY SUPPLIES MUST ENTER DATA FOR 3,000 PARTS BY HANDWRITING; 3,000 (PARTS)×1(MIN)/5(HRS)= 10(DAYS), PROVIDED THAT IT TAKES 1 MIN PER PART, AND OPERATOR ACTUALLY WORKS FOR 5 HRS PER DAY | SELLER WHO HAS MANY PARTS TENDS TO SUPPLY SERIES PARTS, SINCE SERIES PARTS HAVE SIMILAR ARRANGEMENTS, DATA BOUT THEM CAN BE COPIED; 30 MIN, PROVIDED THAT THERE ARE 30 TYPES OF SERIES PARTS, AND IT TAKES 1 MIN PER PART |
| RECEPTION OF ANSWER DOCUMENTS | EACH SELLER MUST BRING ANSWER DOCUMENT TO BUYER; ABOUT 1 DAY | ANSWER DOCUMENT CAN BE DELIVERED BY ELECTRONIC MAIL; 3 SEC, PROVIDED IT TAKES 3 SEC TO TRANSMIT ONE PIECE OF ELECTRONIC MAIL |
| CONVERSION OF ANSWER DOCUMENTS INTO ELECTRONIC DATA | DATA ABOUT 100,000 PARTS MUST BE INPUT WITH KEYBOARD. SERIES PARTS HAVE SIMILAR ARRANGEMENTS, AND HENCE DATA ABOUT THEM CAN BE COPIED. ON AVERAGE, HOWEVER, PROPORTION OF SERIES PARTS IS LOW; SUBSTANTIALLY, 600,000 TYPES | ELECTRONIC DATA IS HANDLED; 0 |

FIG. 9

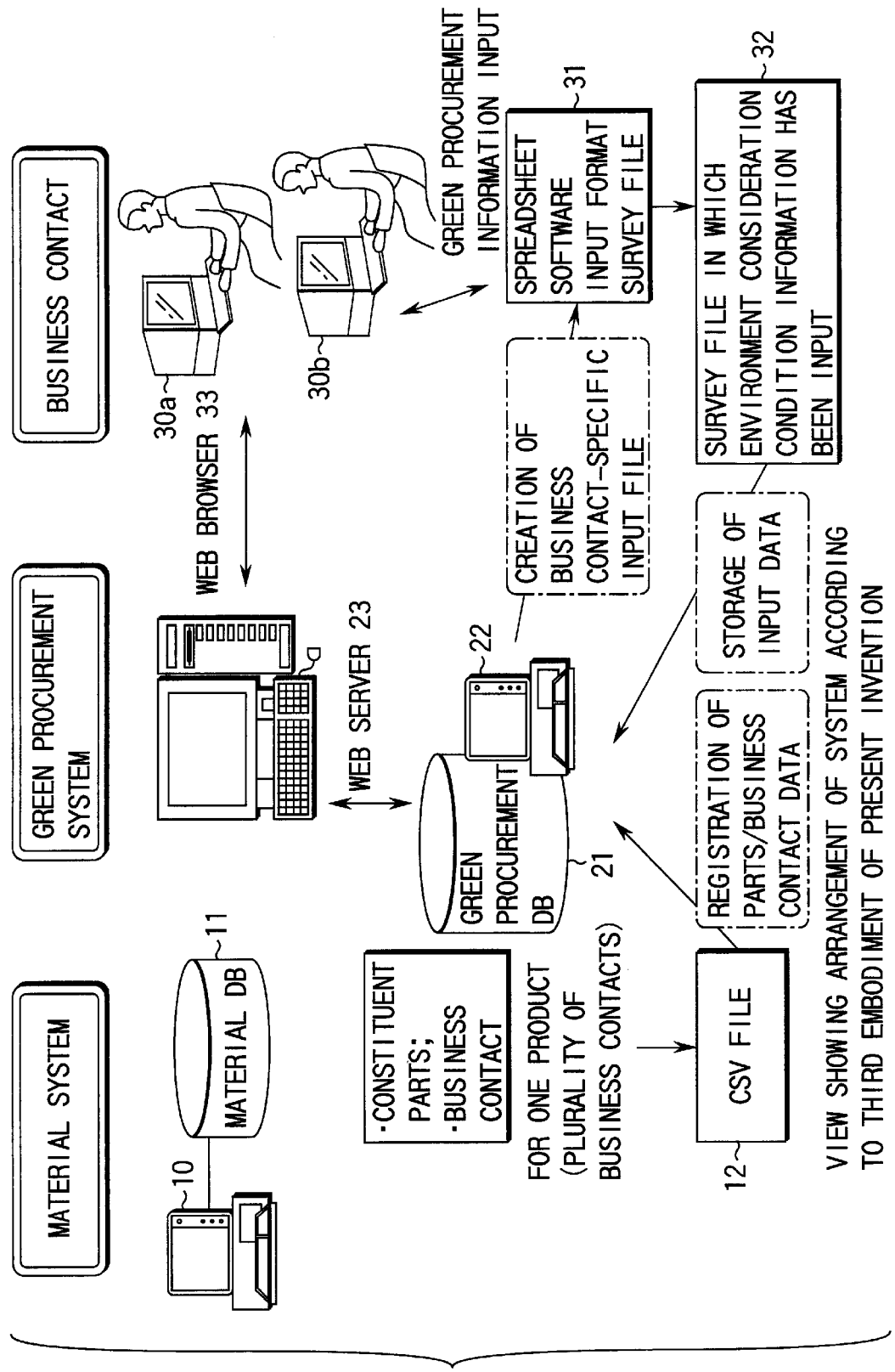
FIG. 10 VIEW SHOWING ARRANGEMENT OF SYSTEM ACCORDING TO THIRD EMBODIMENT OF PRESENT INVENTION

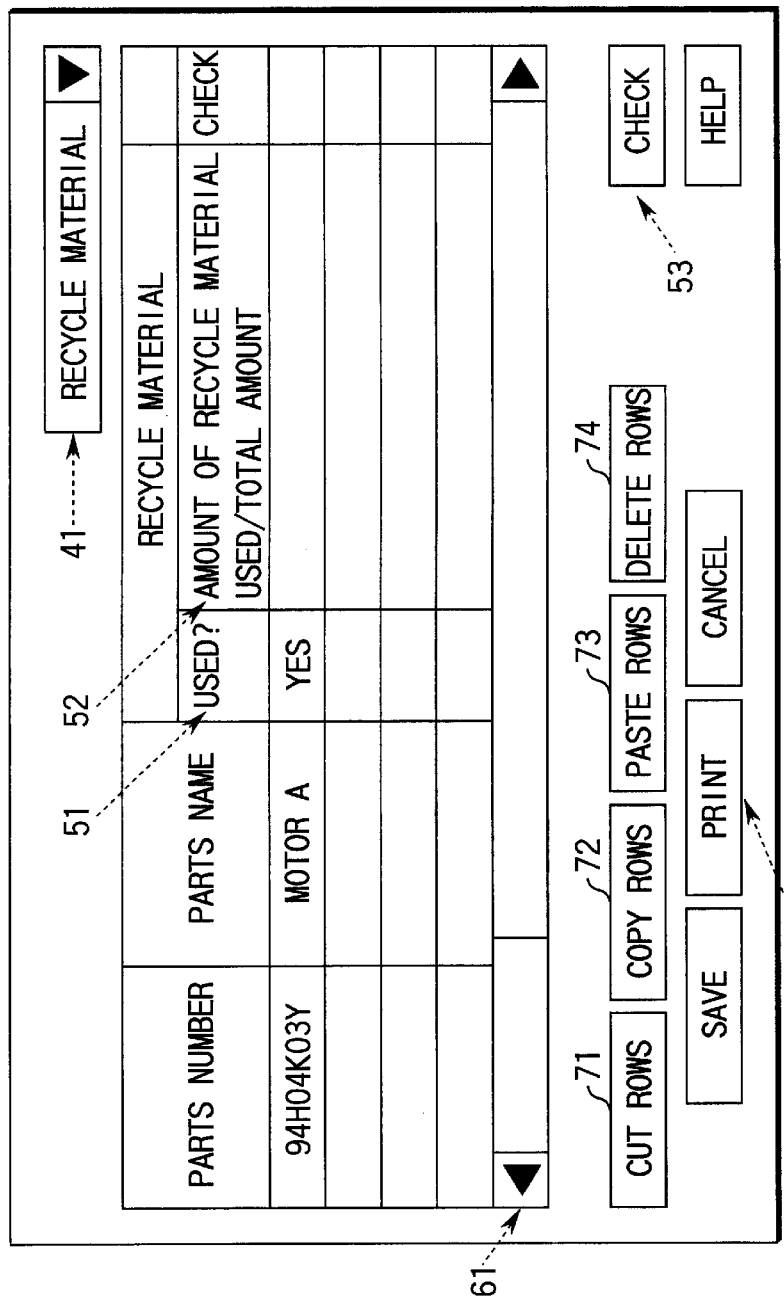
FIG. 11  EXAMPLE OF WINDOW ARRANGEMENT OF SPREADSHEET SOFTWARE INPUT FORMAT ACCORDING TO THIRD EMBODIMENT OF PRESENT INVENTION

| PARTS NUMBER | 94H04K03Y | | |
|---|---|---|---|
| PARTS NAME | MOTOR A | | 41 ······▶ RECYCLE MATERIAL ▶ |

◀    62

| IS RECYCLE MATERIAL USED? | YES |
|---|---|
| AMOUNT OF RECYCLE MATERIAL | |
| SURVEY ITEM 3 | THERE IS NO SIGNIFICANT PROBLEM |
| SURVEY ITEM 4 | NO |
| SURVEY ITEM 5 | HARD MATERIAL IS USED FOR BEARING PORTION TO PROLONG SERVICE LIFE |
| SURVEY ITEM 6 | NO |
| SURVEY ITEM 7 | NO |

71   72   73   74
[CUT ROWS] [COPY ROWS] [PASTE ROWS] [DELETE ROWS]

[TRANSMIT] [CANCEL]

[HELP]

EXAMPLE OF WINDOW ARRANGEMENT ON WEB BROWSER
ACCORDING TO THIRD EMBODIMENT OF PRESENT INVENTION

FIG. 12

OPERATOR DEPARTMENT
NAME
TELEPHONE

PARTS NUMBER 94H04K03Y
PARTS NAME    MOTOR A

I CONFIRM THAT THE FOLLOWING DATA ARE CORRECT

ONE WHO   DEPARTMENT
CONFIRMS  NAME
          TELEPHONE

SIGNATURE [91]

| | |
|---|---|
| IS RECYCLE MATERIAL USED? | YES |
| AMOUNT OF RECYCLE MATERIAL | |
| SURVEY ITEM 3 | THERE IS NO SIGNIFICANT PROBLEM |
| SURVEY ITEM 4 | NO |
| SURVEY ITEM 5 | HARD MATERIAL IS USED FOR BEARING PORTION TO PROLONG SERVICE LIFE |
| SURVEY ITEM 6 | NO |
| SURVEY ITEM 7 | NO |

FIG. 13  EXAMPLE OF PRINTED DOCUMENT WITH SIGNATURE COLUMN ACCORDING TO THIRD EMBODIMENT OF PRESENT INVENTION

| PARTS CODE | SUPPLIER CODE |
|---|---|
| NJ00100 | MKA001 |
| NJ00100 | MKA002 |
| SS00202 | MKB025 |
|  |  |

EXAMPLE OF DATA IN PARTS INFORMATION DB

FIG. 15

```
SUPPLIER CODE
SUPPLIER NAME
OPERATOR'S DEPARTMENT
NAME OF OPERATOR
POST OF OPERATOR
MAIL ADDRESS OF OPERATOR
RESPONSIBLE PERSON'S DEPARTMENT
NAME OF RESPONSIBLE PERSON
POST OF RESPONSIBLE PERSON
MAIL ADDRESS OF RESPONSIBLE PERSON
PUBLIC KEY OF RESPONSIBLE PERSON
```

EXAMPLE OF DATA STRUCTURE
OF SUPPLIER INFORMATION DB

FIG. 16

| SUPPLIER CODE | SUPPLIER NAME | OPERATOR'S DEPARTMENT | NAME OF OPERATOR IN CHARGE |
|---|---|---|---|
| MKA001 | ○○ FACTORY | MATERIAL DEPARTMENT | TARO TANAKA |
| MKA002 | △△ ELECTRIC COMPANY | MATERIAL DEPARTMENT | JIRO JINNAI |
| MKB025 | □□ ELECTRONIC CORPORATION | MATERIAL DEPARTMENT | SABURO SAT |

EXAMPLE OF DATA IN SUPPLIER INFORMATION DB

FIG. 17

```
Subject:REQUEST FOR SURVEY ON WEIGHTS OF PARTS
To:tanaka@shizai.marumasruseisakusho.co.jp
From:shimizu@chousa.batshibatsu.co.jp
("SHIRO SHIMIZU IN CHARGE OF SURVEY IN ××COMPANY")
Replay-To:autosystem@chousa.batshibatsu.co.jp

MR. TARO TANAKA, CHIEF OF MATERIAL DEPARTMENT, ○○ FACTORY

WITH REGARD TO THE SURVEY OF WHICH WE HAVE INFORMED YOU,
WE HAVE COMPLETED PREPARATIONS, SO LET US START THE SURVEY
WITH THIS MAIL. THANK YOU FOR YOUR COOPERATION.

IN ANSWERING THE SURVEY, YOU CAN DIRECTLY PASTE THE PORTION
SANDWICHED BETWEEN "========" AND "========" TO ANSWER MAIL,
AND ENTER ANSWERS IN THE RIGHT SIDES OF THE SYMBOLS ">>".
THEN, PLEASE TRANSMIT THE MAIL TO OUR COMPANY'S OPERATOR IN
CHARGE (autoystem@chousa.batshibatsu.co.jp).

FROM "========"
NAME OF YOUR COMPANY: ○○ FACTORY
YOUR COMPANY'S CODE IN OUR COMPANY: MKA001

WEIGHT(g) OF PART NJ00100>>
WEIGHT(g) OF PART NJ00101>>
WEIGHT(g) OF PART NJ00102>>
WEIGHT(g) OF PART NJ00200>>
WEIGHT(g) OF PART NJ00201>>
WEIGHT(g) OF PART NJ00330>>
WEIGHT(g) OF PART NJ00331>>
WEIGHT(g) OF PART NJ00332>>
TO "========"
```

FIG. 18

```
Subject:REQUEST FOR CHECK ON SURVEY ON WEIGHTS OF PARTS
To:goto@shizai.marumasruseisakusho.co.jp
From:shimizu@chousa.batshibatsu.co.jp
("SHIRO SHIMIZU IN CHARGE OF SURVEY IN ××COMPANY")
Replay-To:autosystem@chousa.batshibatsu.co.jp

MR. GORO GOTO, MANAGER OF MATERIAL DEPARTMENT, ○○ FACTORY

WITH REGARD TO THE SURVEY OF WHICH WE HAVE INFORMED YOU,
WE HAVE RECEIVED THE FOLLOWING ANSWERS FROM MR. TARO
TANAKA, THE CHIEF OF THE MATERIAL DEPARTMENT. WE NOW ASK
YOU TO CHECK THE CONTENTS AND SEND APPROVAL MAIL TO US.

FIRST, PLEASE DIRECTLY PASTE THE PORTION SANDWICHED BETWEEN
"========" AND "========" TO THE APPROVAL MAIL, AND DELETE
ONE OF THE LINES INDICATED BY THE SYMBOLS ">>". THEN, PLEASE
TRANSMIT THE MAIL AFTER ENCRYPTING AND ELECTRONICALLY
SIGNING THE MAIL IN ACCORDANCE WITH INSTRUCTION THAT WE
GAVE YOU BEFORE.

FROM "========"
NAME OF YOUR COMPANY: ○○ FACTORY
YOUR COMPANY'S CODE IN OUR COMPANY: MKA001

CONTENTS OF ANSWERS
WEIGHT(g) OF PART NJ00100: 31g
WEIGHT(g) OF PART NJ00101: 415g
WEIGHT(g) OF PART NJ00102: 926g
WEIGHT(g) OF PART NJ00200: 53g
WEIGHT(g) OF PART NJ00201: 589g
WEIGHT(g) OF PART NJ00330: 793g
WEIGHT(g) OF PART NJ00331: 238g
WEIGHT(g) OF PART NJ00332: 46g
>> I APPROVE THE CONTENTS OF THESE ANSWERS
>> I DO NOT APPROVE THE CONTENTS OF THESE ANSWERS
TO "========"
```

FIG. 19

METHOD OF ACQUIRING ENVIRONMENT CONSIDERATION CONDITION INFORMATION

CROSS-REFERENCE TO RELATED APPLICATIONS

This application is based upon and claims the benefit of priority from the prior Japanese Patent Application No. 11-274706, filed Sep. 28, 1999, the entire contents of which are incorporated herein by reference.

BACKGROUND OF THE INVENTION

The present invention relates to a method of acquiring environment consideration condition information used for a green procurement system or the like which is an information survey/processing system associated with material procurement with consideration given to environmental problems.

The disposal and incineration of toxic substances have seriously affected the terrestrial environment. In order to reduce environmental pollution, attempts have been made to avoid the use of materials, for industry products, which contain toxic substances or discharge toxic substances depending on the manner in which they are processed.

As part of such attempts, product makers as buyers that promote environmental management and environmental load reduction activities in conformity with ISO14000 need to order environment-conscious (materials with a low degree of environmental load influence) in material procurement in order to comprehend, maintain/improve, manage the eco-friendliness of products.

A system that can meet such a requirement is disclosed in, for example, Jpn. Pat. Appln. KOKAI Publication No. 10-312417. In this system, material item data that can be ordered are formed and stored in units of material classes on the material procurement side, whereas the environment consideration degrees of the respective material items are evaluated and the resultant environment consideration degree evaluation data are stored on the design side. In ordering materials, material items that can be ordered are selected on the basis of requested material data from the production side, and material order data is output, with environment consideration degree evaluation data being added thereto.

In order to construct and operate an information processing system that effectively uses such environment consideration conditions of procurement materials (materials to be procured) as data, data about the environment consideration conditions of the procurement materials must be prepared. To obtain such data about the environment consideration conditions of procurement materials, a survey must be conducted in cooperation with material sellers.

Such a survey is executed by a plurality of buyers. Conventionally, however, in conducting a survey, a survey table written or printed on a paper sheet is handed to a material seller, and answers are acquired in the form of an answer table written or printed on a paper sheet.

For this reason, similar contents about similar procurement materials must be written repeatedly over lines, resulting a heavy load on a person who writes answers.

In order to check consistency in the answer contents, and process and reuse the data, the operator must electronically input the answers written on the paper sheet, imposing a heavy load on the operator. In addition, errors may be caused in this step.

Under the circumstances, a system for ordering materials with consideration given to the environment (materials with low degrees of environmental load influence) has been proposed. In this system, material item data that can be ordered are created for each material class and stored in advance on the material procurement side. On the design side, the environment consideration degrees of the respective material items are evaluated, and the resultant environment consideration degree evaluation data are stored. In ordering materials, material items that can be ordered are selected on the basis of requested material data from the production side, and material order data is output after the environment consideration degree evaluation data is added thereto.

In order to construct an information processing system that fully uses such environment consideration conditions of procurement materials as data, the data of the environment consideration condition of the procurement materials must be prepared. In addition, sellers for parts and raw materials (sellers of parts and raw materials) must cooperate to acquire data about the environment consideration conditions of procurement materials.

In conducting such a survey, a survey table on a paper sheet is handed to a material seller (sellers of parts and raw materials), and answers are obtained by asking the material seller to write the answers on an answer table on a paper sheet.

For this reason, similar contents about similar procurement materials need to be repeatedly written over lines, resulting in a heavy load on a person who writes the answers.

In addition, to check consistency in answer contents, and process and reuse data, the answers written on a paper sheet must be electronically input. This operation also imposes a heavy load on the operator, and may cause errors.

With the widespread use of general-purpose personal computers, it is natural that acquired data are used through general-purpose personal computers. In addition, general-purpose personal computers are popularized and can be used by many people. Under such present conditions, it is preferable that a survey based on material item data and acquisition of survey results be performed on a computer network, or such data be exchanged through electronic storage media.

More specifically, electronic survey document data having survey items written in a tabular form with blank answer columns is prepared. For example, this data is stored in a portable storage medium such as a flexible disk, MO (magneto-optical disk), or memory card, and this medium is handed to a material seller. On the material seller side, an operator is asked to open the electronic survey document data on a computer, e.g., a personal computer, and enter answers to necessary items in survey items in the table. The operator is then asked to store the answer-entered electronic survey document data in a portable storage medium. Thereafter, this medium is collected. The answer contents are loaded in the personal computer and stored. With the use of this method, redundant operations can be omitted, and errors such as transcription errors can be effectively prevented. Alternatively, a buyer may ask a material seller to access the above electronic survey table data prepared on a personal computer on the buyer side by using a personal computer on the material seller side through a computer network to as to enter/answer necessary items in survey items in the table. The operator on the buyer side then loads the answer contents in the personal computer and stores it.

The construction of a mechanism for forming electronic data and exchanging them will reduce time and labor required in half and greatly eliminate trouble in the prior art, preventing input errors. Such a mechanism cannot be simply implemented for the following reasons no matter how it is desired.

First, it is difficult to prepare an environment that allows common use of files as electronic data. Basically, electronic data is generated by a buyer that is to use the data, and the buyer asks a material seller to provide information for such data. However, such data need not essentially be prepared or used on the material seller. On the buyer side, in order to manage and use many procurement parts data, a large-scale processing system is constructed and used. On the material seller side, however, data are processed within the range of materials that are handled by the material seller. That is, the scale of data processing in a material seller greatly differs from that in a buyer. With regard to applications, an application aiming at large-scale data processing tends to be unsuited to small-scale data processing, whereas an application aiming at small-scale data processing is unsuited to large-scale data processing. For this reason, it is difficult to implement a processing system that can serve as both a simple electronic data processing system that allows even a small-scale material seller to input data and a large-scale information processing system capable of managing/using many procurement data in a buyer.

Second, in using electronic survey table data in a form designed to describe survey items in a tabular form and enter answers in answer columns prepared as blank columns, a problem is posed in the format of the table. For example, to allow even a small-scale material seller to easily input data, a window arrangement and input/output specifications similar to those of general-purpose information processing software are preferably used. In general, a landscape sheet is generally used for spreadsheet software, whereas a sheet similar to a Web page in the Internet that has rapidly become widespread is a portrait sheet. In the former case, the longitudinal direction coincides with the horizontal direction of a sheet. In the latter case, the longitudinal direction coincides with the vertical direction of a sheet. Owing to this difference, it is impossible to satisfy the requirements for the two formats at once.

Third, a problem is likely to arise in terms consistency in data. Part of electronic data can be easily deleted. For this reason, a material seller may answer only some of procurement parts to be surveyed, and the corresponding blank columns remain blank, posing a problem in terms of consistency in data.

Fourth, a heavy load is imposed on an operator who inputs data. When importance is attached to precision, a variety of information needs to be acquired. In expressing diverse survey items in a tabular form, the resultant table becomes large in size. Since the table is too large to be displayed on a display having a limited display area, only part of the table can be displayed on the screen. To fill item contents, the operator must scroll the table on the screen. In this case, the operator cannot quickly display a portion in which he/she wants to enter data, and must search for a target column and fill a necessary item by scrolling. This imposes a heavy load on the operator who inputs data.

Fifth, it is difficult to distinguish between an item with great importance and an item with little importance. Among diverse survey items, some item has great importance and some item has little importance. If, however, survey items are expressed as electronic data in a tabular form, all the items are expressed uniformly in terms of importance. This makes it difficult to recognize which item has great importance.

Sixth, a problem arises in terms of security. It is easy to falsify part of electronic data. For this reason, when data is simply expressed in a tabular form, anyone can falsify the data. In some case, the range of responsibility of a responsible person who has confirmed that the data had no error becomes uncertain.

As described above, when necessary information is electronically acquired, redundant operations can be avoided, and data can be used without any input errors due to transcription. On the other hand, there are various problems that need to be solved, e.g., problems associated with a heavy load imposed on a person who enters answers, maintenance of consistency in input data, the format of a table, security, and the preparation of an application that can be easily used by both a buyer who manages and uses data and a material seller who is asked to cooperate in acquiring data.

BRIEF SUMMARY OF THE INVENTION

It is an object of the present invention to provide a method of acquiring environment consideration condition information, which can easily acquire answers to target survey items without redundant operations so as to rationalize data acquisition.

According to the present invention, there is provided a method of acquiring environment consideration condition information, comprising the steps of extracting supplier-specific material item data from data of various material items used for the manufacture of a product, using general-purpose spreadsheet software to create tabular data having a structure that allows various pieces of environment consideration condition information about the extracted data to be input, laying out the tabular data to locate an item whose contents are likely to change at an end of a table so as to minimize a change in data structure in the event of a change in contents of environment consideration condition items, providing the supplier with the tabular data, and acquiring environment consideration condition information about each material item by using the tabular data containing the environment consideration condition information added to the tabular data on the supplier side.

According to the present invention, a survey source extracts seller-specific (supplier-specific or parts/material maker-specific (i.e., survey target)) data of material items from data of various material items used for the manufacture of a product, creates data having a structure that allows environment consideration condition information to be input, and provides the data. This makes it possible to seamlessly implement the application of the present invention between a large-scale information processing system capable of managing/using many procurement data in a buyer and a simple electronic data processing system that allows even a small-scale material seller to easily input data.

Since supplier-specific data of material items are extracted from data of various material items, and tabular data having a structure that allows environment consideration condition information about the extracted data to be input is created by using general-purpose spreadsheet software, in particular, an operator can open the tabular data and input various pieces of environment consideration condition information in the table at any place. For this reason, when data is input in one input step, the data can be reused. This makes it possible to eliminate redundant operations of transcribing data as in the case of a questionnaire and rationalize data acquisition.

The various environment consideration condition items in the table of tabular data are laid out to locate an item whose contents are likely to change at the end of the table so as to minimize a change in data structure in the event of a change in contents of environment consideration condition items. This data is provided to the supplier. The supplier acquires environment consideration condition information about each material item by using the tabular data containing the environment consideration condition information added to the tabular data. Even if, therefore, the contents of an environment consideration condition item change, only the end portion of the table changes in data structure, but other portions are not influenced by the change. This prevents complication in data processing in forming acquired data into a database.

Data having a structure that allows environment consideration condition information to be input has a document format based on general-purpose spreadsheet software.

Since data having a structure that allows environment consideration condition information to be input has a document format based on general-purpose spreadsheet software, even a small-scale material seller can easily input data.

Data having a structure that allows environment consideration condition information to be input has a hypertext document format that allows data to be browsed and input by a Web browser.

Since data having a structure that allows environment consideration condition information to be input has a hypertext document format that allows data to be browsed and input by a Web browser, even a small-scale material seller can easily input data.

In addition, data having a structure that allows environment consideration condition information to be input can selectively have a document format based on general-purpose spreadsheet software and a hypertext document format that allows data to be browsed and input by a Web browser. If the document format based on the general-purpose spreadsheet software is selected, survey items are arranged in a tabular form in landscape orientation. When the hypertext document format that allows data to be browsed and input by a Web browser is selected, survey items are arranged in a tabular form in portrait orientation.

This allows an operator to easily and quickly input environment consideration condition information regardless of diverse survey items.

Electronic mail describing necessary items as information acquisition targets and a return address is transmitted to an individual at an information provider. Upon reception of return mail in which necessary items have been entered from the receiving side by electronic mail returned to the return address, an operator transfers the entered contents and return address information of the return mail to a responsible person at the information provider. When return mail whose contents have been approved is received from the responsible person himself/herself, information from the information provider is accepted.

In this case, the survey source transmits return address information and necessary items as information acquisition targets to an individual at the information provider in the form of electronic mail. Upon reception of return mail whose contents reply this electronic mail at the return address, the survey source transmits the mail to another individual (responsible person) at the information provider to ask him/her to check the contents and return the resultant mail to the designated return address.

According to this scheme, environment consideration condition information is acquired by using electronic mail. The first destination is a supplier-side operator, i.e., an operator in charge at a business contact, and the second destination is a responsible person, e.g., a person superior to the operator at the supplier side.

With electronic mail, data contents to be exchanged can be used upon transcription, and answers can be obtained by sending mail to an individual. By separately sending mail to an answering side and an approving side, the mail contents can be checked. This makes it possible to easily acquire information with high authenticity. Since information that has been checked by return mail obtained through different routes is recorded on a database, the survey source can adopt checked information as the contents of a survey sheet without performing troublesome operation, e.g., transcription.

In addition, an answering side (information provider) is only required to have an electronic mail client. This is a novel method as a simple information acquisition method capable of implementing even a procedure for obtaining approval from a responsible person.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4C are views for explaining a survey sheet used in the present invention;

FIGS. 5A to 5C are views for explaining a survey sheet used in the present invention;

FIGS. 6A to 6C are views for explaining a survey sheet used in the present invention;

FIGS. 7A to 7C are views for explaining a survey sheet used in the present invention;

FIG. 8 is a view showing the arrangement of a system according to the second embodiment of the present invention;

FIG. 9 is a view for explaining the differences in effect between the technique of the first and second embodiments and the conventional technique;

FIG. 10 is a view showing the arrangement of a system according to the third embodiment of the present invention;

FIG. 11 is a view showing an example of the window arrangement of a spreadsheet software input format;

FIG. 12 is a view showing an example of a window arrangement on a Web browser according to the third embodiment of the present invention;

FIG. 13 is a view showing an example of a document with a signature column according to the third embodiment of the present invention;

FIG. 15 is a view showing an example of data in a parts information DB according to the fourth embodiment of the present invention;

FIG. 16 is a view showing an example of the data structure of a supplier information DB according to the fourth embodiment of the present invention;

FIG. 17 is a view showing an example of data in the supplier information DB according to the fourth embodiment;

FIG. 18 is a view showing an example of survey mail according to the fourth embodiment of the present invention; and FIG. 19 is a view showing an example of check mail according to the fourth embodiment of the present invention.

DETAILED DESCRIPTION OF THE INVENTION

Figure 1:
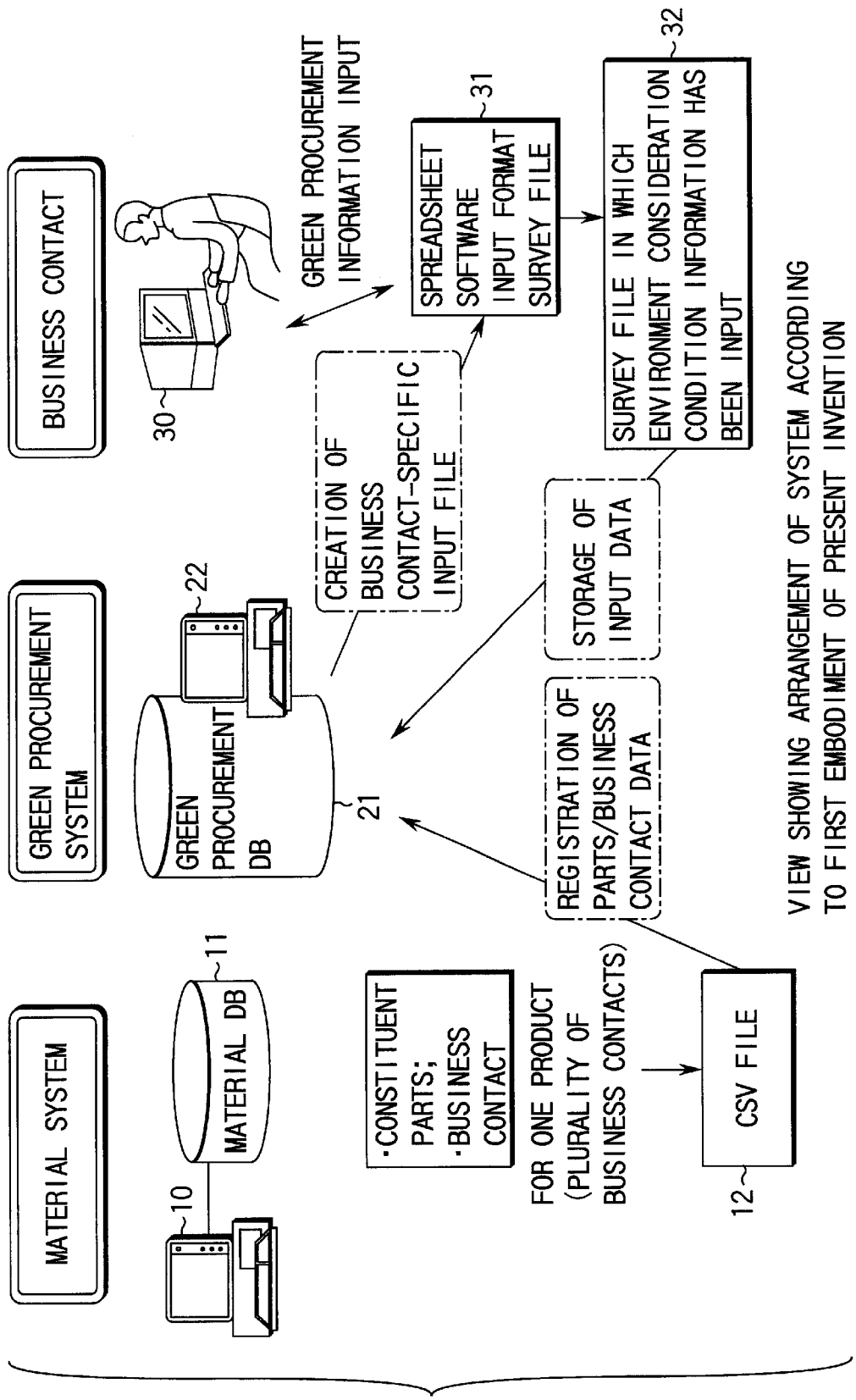
FIG. 1 is a view showing the arrangement of a system according to the first embodiment of the present invention.

The present invention will be described in detail below with reference to the accompanying drawings. The present invention provides solutions to the theme of how to facilitate acquisition of data required for the procurement of products, parts, materials, and raw materials with low environmental loads in manufacturing products.

Manufacturing products suffer problems of how to procure products, parts, materials, and raw materials with low environmental loads, when the products are considered from an environmental viewpoint. The present inventors define the procurement of products, parts, materials, and raw materials from this point of view as green procurement, and have made an attempt to implement a data acquisition system which can acquire data required for green procurement at minimum expense in time and effort without requiring transcription and the like, and allows the acquired data to be used as a database.

In practice, in implementing green procurement based on the above definition, the following two points must be taken into account. First, products, parts, materials, and raw materials should be procured from buyers which are promoting environmental conservation. Second, products, parts, raw materials, and materials with low environmental loads in a life cycle (i.e., the steps of raw material procurement, manufacture, distribution, consumption, disposal, and the like) should be procured.

To procure products, parts, raw materials, and materials with low environmental loads is to procure products, parts, raw materials, and materials with consideration given to resource savings, energy savings, long-term use, reuse, recycling, the use of recycle materials, easiness of processing/disposal, inhibition/reduction/management of environment-related substances, and the like.

In designing products, the design department must select products, parts, raw materials, and materials from this viewpoint. For this purpose, the design department must acquire reference data for green procurement to create a database as a green procurement database in advance. In order to create such a database, information about parts, materials, and raw materials to be used for products to be manufactured must be provided from suppliers (parts/material makers).

According to the present invention, basic information for green procurement is acquired with minimum loads on a survey source (buyer that designs and manufactures a product) and survey targets (suppliers (buyers) of parts, materials, and raw materials to be used for the product to be manufactured), and the survey source creates a green procurement database using the acquired data. An example of such operation will be described below.

A method of acquiring environment consideration condition information according to the first embodiment of the present invention will be described first with reference to FIG. 1. In this case, at the survey source, a file of a tabular survey sheet indicating survey contents is stored in a portable recording medium such as a flexible disk or optical disk. This recording medium is handed to a survey target. At the survey target, the file of the survey sheet is loaded into a personal computer to enter answers in answer columns. The file of the answered survey sheet is then stored in a portable recording medium. This operation makes it possible to avoid redundant operation of writing inquiry contents for the respective products, writing answers at the survey target, and inputting data of the contents written on the answer sheet at the survey source as in the prior art in which survey sheets are handled in paper.

More specifically, a database 11 is installed in the material procurement department. Information of parts of each product designed in the design department is registered in the database 11, together with parts/material maker information (business contacts) of the parts and the like. The database 11 is managed by a computer 10 in the material procurement department. Obviously, the computer 10 has standard equipment such as a drive unit capable of reading/writing a portable recording medium, a communication interface for communication with the outside, a keyboard and pointing device as man-machine interfaces, and a display unit. In addition, the computer 10 can execute an application having the function of creating data in the database 11 into a file, as needed, by processing, editing, and altering it.

According to the present invention, in order to acquire basic data required to form a questionnaire for a survey, the computer 10 extracts parts information corresponding to one designated product and parts/material maker information of the parts from the database 11, and records the information as a CSV (Comma Separated Value) file on a portable recording medium, thereby creating an electronic file 12.

A green procurement database 21 is managed by a computer (personal computer) 22. The green procurement database 21 is created by storing the names and environment consideration condition information of parts, materials, and raw materials used for a product to be manufactured (the following pieces of information about the parts, materials, and raw materials: information about resource savings, information about energy savings, information about long-term use, information about reuse, information about recycling, information about the use of recycle materials, information about easiness of processing/disposal, information about the utilization states of environment-related substances, and the like) in the form of a database, together with information about suppliers (parts/material makers). The computer 22 manages the green procurement database 21, creates a database, and performs maintenance/management.

Obviously, the computer 22 has standard equipment such as a drive unit capable of read-/write-accessing a portable recording medium, a communication interface for communication with the outside, a keyboard and pointing device as man-machine interfaces, and a display unit. General-purpose spreadsheet application software such as Excel (general-purpose spreadsheet application software available from Microsoft Corporation) or Lotus 1-2-3 (general-purpose spreadsheet application software available from Lotus Development Corporation) is installed in the computer 22. By using this general-purpose spreadsheet application software, the computer 22 can create a tabular survey sheet having required contents by loading a CSV file and editing, processing, and partly extracting the file data, and can also record the sheet as a file 31 on a portable recording medium.

A computer 30 is a general-purpose computer at a business contact (supplier of parts, materials, and raw materials used for a product to be manufactured). The computer 30 has standard equipment such as a drive unit capable of read-/write-accessing a portable recording medium, a communication interface for communication with the outside, a keyboard and pointing device as man-machine interfaces, and a display unit. The computer 30 is a general computer in common use, in which general-purpose spreadsheet application software like the one described above is installed. By using this general-purpose spreadsheet application software, the computer 30 can edit, process, and partly extract the data of the file 31 of the survey sheet upon loading it, create a survey sheet in which environment consideration condition information is input by entering necessary information in blank answer columns of the tabular survey sheet having predetermined contents, and record the sheet as a file 32 on a portable recording medium.

The operation of this system having the above arrangement will be described next.

In this embodiment, data of parts, materials, raw materials, and the like for each product, and information about the corresponding parts/material makers and suppliers, which are basic data for green procurement, are acquired in advance from the database 11 held by a material procurement department in a buyer.

The database 11 held by the material procurement department stores data of parts, materials, raw materials, and the like required for each product designed by the design department, and information about the parts/material makers or suppliers in order to procure parts, materials, and the like required to manufacture each product in the manufacturing department. These pieces of information are used as basic data. Note that the material procurement department mainly serves to order/manage materials, and hence does not hold environmental load information of the materials.

Basic information (material names and supplier names) for creating a database of information for green procurement is acquired from the database 11 held by the material procurement department. For this purpose, the operator accesses the database 11 through the computer 10 for managing the database 11 to extract necessary data about materials (parts, materials, raw materials, and the like to be used) of each product, supplier names, and the like, create CSV (Comma Separated Value) data, and store it, thereby creating the CSV electronic file 12 (S1, S2 in FIG. 2).

In this case, CSV is a file format in which each column is delimited with a comma ",", and line feed is performed for each line (record). Many database applications and spreadsheet applications have the file storage function of storing data in this file format. In addition, since a CSV file is a simple text file, the file can be loaded into spreadsheet software to be used and can also be loaded into many applications operating on a general-purpose personal computer to be processed. For this reason, in the present invention, data is to be exchanged in the form of this versatile CSV file.

Pieces of necessary information such as the names, parts numbers, and parts/material makers of parts as components of each product designed by the design department are stored in the database 11 held by the material procurement department in correspondence with each product. The data file 12 obtained by converting these data into CSV data is stored in a portable recording medium. This medium is transported to the computer 22 connected to the green procurement database 21 in the system of the present invention and set in the drive unit. The data file 12 is loaded into the computer 22. The computer 22 then edits and processes the contents of the loaded data by using spreadsheet software to form a tabular survey sheet having desired contents for a questionnaire (S3 in FIG. 2).

That is, the data of parts and materials for one product and the data of the suppliers of the parts and materials are stored in the data file 12 in CSV. Therefore, the data file 12 is loaded into the computer 22, and the loaded data are classified according to the suppliers to create a database. As a consequence, parts data are stored in the green procurement database 21 in correspondence with the suppliers. The user operates the computer 22 to list survey items on the basis of the above data, thereby forming a survey sheet listing the parts classified by supplier and desired survey items related to the parts. Since survey items must be assumed to vary depending on the target parts and materials, the user selects optimal survey items like "item 1", "item 2", "item 3", "item 4", "item 5", . . . , "item n" for each product, as indicated by symbol "21a" in FIG. 2, and input them as information in advance. This product-specific survey item data is stored in the green procurement database 21.

With this operation, the user can search the green procurement database 21 for the data of a target part by using a parts name and parts code as keys, retrieve the contents of various survey items associated with the part, and extract the data.

According to the system of the present invention, a buyer as a survey source, which manufactures a product, forms a survey sheet. That is, the survey source forms a desired survey sheet by using data in the green procurement database 21, gives this sheet to a parts supplier as a survey target (material supplier: parts/material supply side), and asks the supplier to enter answers in blank answer columns. On the basis of this survey sheet, the survey source user forms a survey sheet dedicated to each parts supplier on the computer 22 by using spreadsheet software.

Figure 2:
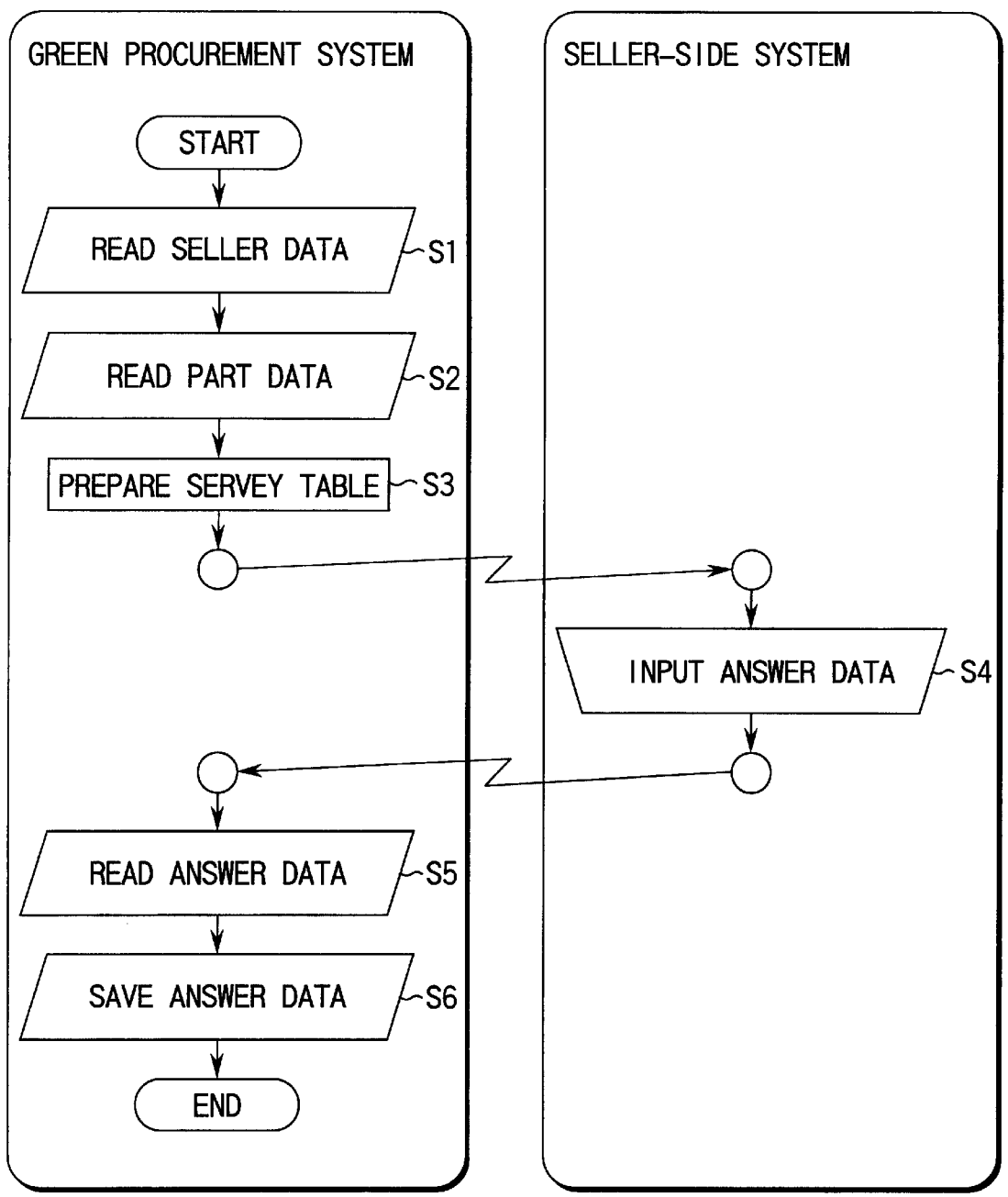
FIG. 2 is a view for explaining the present invention and illustrates the flow of processing in the first embodiment of the present invention.

As shown in FIG. 2, the survey source user operates the computer 22 to design a desired table by using spreadsheet software. The survey source user then operates the computer 22 to form a tabular parts supplier-specific survey sheet 31a by extracting parts supplied from each supplier and survey items for each part from data read out from the green procurement database 21, and inputting the extracted data in corresponding portions of the designed table.

The user records this tabular supplier-specific survey sheet 31a as the survey file 31 in the document format (file type) of general-purpose spreadsheet software, e.g., the CSV format, on a portable recording medium. The user then gives the file to the parts supplier and asks him/her to enter data in answer columns.

The parts supplier carries the portable recording medium on which the survey file 31 is recorded to his/her office. The parts supplier then sets the survey file 31 in the computer 30 in the office and opens it by using spreadsheet software installed in the computer 30. Since the survey file 31 is a CSV data file, even if the spreadsheet software at the survey source (survey requesting side: buyer) differs from the spreadsheet software at the supplier side (the company which supplies parts and materials) which is asked to answer the questionnaire, the supplier can open the file and enter answers. If the spreadsheet software at the survey request source is identical to that at the supplier which is asked to answer the questionnaire, or the software on one side has the conversion function (file conversion function) of, for example, converting a file into a file based on the spreadsheet software of the other side in the self-computer, each file may be exchanged in the file format conforming to the spreadsheet software used on the other side.

On the supplier side, the operator enters answers in the survey sheet 31a opened on the computer 30 in the supplier's office in accordance with the contents of the survey items listed like "item 1", "item 2", "item 3", "item 4", "item 5", . . . , "item n̲". The operator then records the answered survey sheet 32 as a CSV file on a portable recording medium, and gives it to the survey source.

At the survey source, this recording medium is set in the computer 22, and the contents of the answered survey sheet 32 are loaded (S5 in FIG. 2). The loaded contents are then reflected in the green procurement database 21 (S6 in FIG. 2).

When the survey sheet in which answers are written is to be loaded, parts codes are used as keys to search the green procurement database 21 for the data of the corresponding parts, and the answer contents are written in the survey item columns corresponding to the parts data. This operation can be performed by using a technique of executing macros prepared by describing processing contents in macro statement using the macro function of spreadsheet software or database software or executing a prepared processing program.

As described above, at the survey source, information of a survey sheet in which answers associated with environment consideration conditions are written is loaded to be reflected in the green procurement database 21, thus automatically creating a practical green procurement database. If, however, laws and rules are revised, social requirements change, or the strategies of the buyer are altered, item contents may need to be changed, added, or omitted. It is therefore necessary to quickly cope with such a situation.

Assume that a re-survey is to be conducted on parts data for which answers have already been written. In this case, when a survey sheet is formed by listing survey items, written answers to the previous survey may be written in the survey sheet.

In this case, the layout of the survey sheet changes. In any case, it is difficult to automatically reflect the answers on the survey sheet in the database unless it is ruled that each survey item data is written in a specific column on a survey sheet.

For this reason, the present invention provides a technique of minimizing the amount of revision of a survey sheet with respect to a change in layout. This point will be described next.

Figure 3:
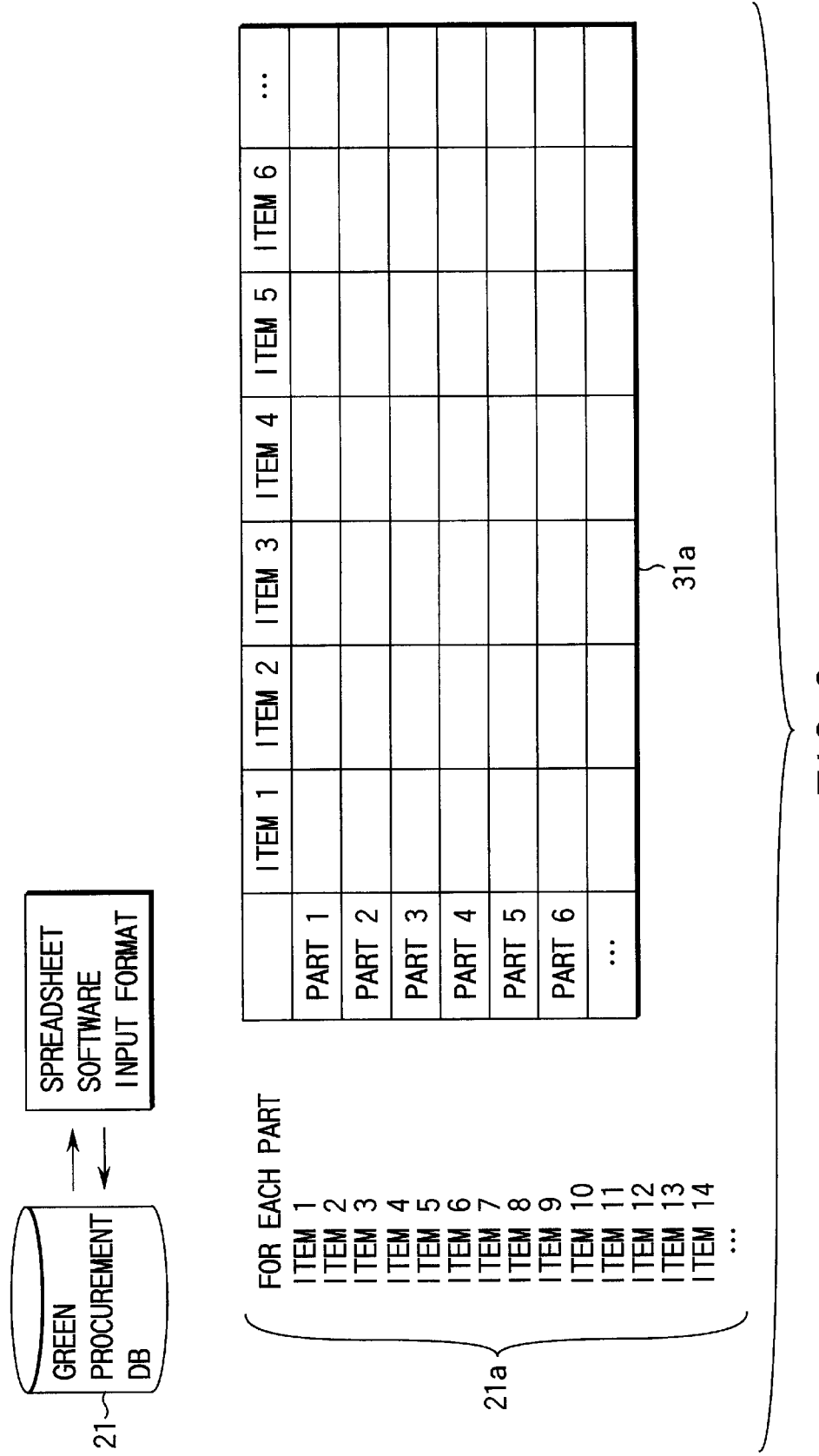
FIG. 3 is a view for explaining the formation of a survey sheet having a list of survey items, supplier-specific parts, and desired survey items associated with the parts.

According to the present invention, as shown in detail in FIG. 3, a survey sheet is laid out to set, on the first portion of the table, inherent information portions basically regarded as changeless portions such as the name of the maker of parts or the like (item name "company name"; the first column position on the survey sheet), the parts number of a part to be procured by the buyer (item name "procurement parts number"; the second column position on the survey sheet), the parts name of the procurement part (item name "parts name"; the third column position on the survey sheet), a check column (item name "check"; the fourth column position on the survey sheet), the parts code in the parts maker (item name "buyer parts code"; the fifth column position on the survey sheet), the name of a department in charge of designing/manufacturing the part in the parts maker (item name "department name"; the sixth column position on the survey sheet), and the name of a parts maker-side operator in charge of answering questions about the part (item name "your name"; the seventh column position on the survey sheet).

Information to be acquired includes "mass of part (or material)", "recyclability", "use of recycled material", "environment-related substance", and the like. The layout of these pieces of information determines the ability to cope with changes in conditions afterward. This will be described below.

Information of "environment-related substance" is variously ranked, including information about a substance whose use is highly restricted by a law or regulation, a substance that demands consideration when it is used, and the like. For example, "asbestos" and the like are substances whose use is prohibited, and "cyan compound" is a substance the emission of which to the environment must be suppressed. Furthermore, there are substances like "carbon compound", whose use is loosely restricted at present, but may be strictly restricted in the future.

As described above, although "environment-related substance" includes substances whose ranks will remain unchanged, some substances may be included/omitted in/from this item in cases wherein a given company promotes measures against environmental problems, findings, e.g., the toxicity of a substance and environmental influence, are revealed, and legal restrains, voluntary restrains in the field, and the like are revised.

Assume that a given company starts a survey on "asbestos", "cadmium and its compounds", "chrysotile", "cyan compound", "lead and its compounds", "arsenic and its compounds", and "phthalate (esters of phthalic acid)" on the basis of the Air Pollution Control Law. In this case, for example, it is highly possible that "zinc compounds" will be added to the survey afterward in consideration of the Water Pollution Prevention Law.

According to the present invention, a survey sheet is laid out to locate such an item as close to the end of the sheet as possible.

FIGS. 4A to 4C show such a layout. FIGS. 4A to 4C show a "good example". In this "good example, the item "environment-related substance" in which the number of sub-items is likely to change is located at the end of the list, whereas the items "mass", "recyclability", and "use of recycled material" in which the numbers of sub-items are not likely to change are listed near the head of the list.

In this case, the survey sheet is laid out such that the survey item "mass" is located at the eighth column position on the survey sheet; the survey item "recyclability", at the ninth column position on the survey sheet; the survey item "use of recycled material", at the 19th column position on the survey sheet; and the survey item "environment-related substance", at the 29th column position on the survey sheet.

When a survey sheet is to be formed on the basis of data in the green procurement database (DB) 21, survey items may be sequentially written in correspondence with the column positions in such a manner that the respective survey items are sequentially written at the column positions in the list laid out in accordance with the above column arrangement. In addition, when a survey sheet in which answers are written is to be loaded and stored in the green procurement database (DB) 21, the contents written in the corresponding columns may be loaded and stored in the DB 21 in a similar manner.

Even if "zinc compound" is added to the item "environment-related substance", the addition of only one column to the end of the list will suffice as a layout change. Therefore, there is no need to change the column positions of other survey items before the item "environment-related substance", e.g., "mass of part (or material)", "recyclability", and "use of recycled material". With this arrangement, even if "zinc compound" is added to "environment-related substance", the layout in FIGS. 4A to 4C are only changed to the layout in FIGS. 5A to 5C. That is, the addition of only one column to the end of the list will suffice as a layout change.

Basically, there is no need to change a program (or macro) for forming a survey sheet based on data in the DB 21 and a program (or macro) for loading data from a sheet in which answers are written, and storing the data in the DB 21.

Even if answers on a survey sheet in a given format without "zinc compound" intermingle with answers on a survey sheet in a new format with "zinc compound", data can be sequentially stored in the DB 21 in the same manner as described above.

In contrast to this, for example, the layout shown in FIGS. 6A to 6C undesirably requires diverse changes.

In the "bad example" in FIGS. 6A to 6C, the item "environment-related substance", in which the number of sub-items is likely to change is located before the items "recyclability" and "use of recycled material" in which the numbers of sub-items are not likely to change.

More specifically, the survey sheet is laid out such that the survey item "mass" is located at the eighth column position on the survey sheet; the survey item "environment-related substance", at the ninth column position on the survey sheet; the survey item "recyclability", at the 16th column position on the survey sheet; and the survey item "use of recycled material", at the 26th column position on the survey sheet.

If, therefore, "zinc compound" is added to "environment-related substance", the sub-item "zinc compound" is added to the survey item "environment-related substance", and the column positions of the successive items "recyclability" and "use of recycled material", must be shifted, as shown in FIGS. 7A to 7C.

The addition of a sub-item will influence both the column position of a survey item in which the change has occurred and the column positions of other survey items. In this case, the position of the survey item "recyclability" changes from the 16th column position to the 17th column position. The position of the survey item "use of recycled material", changes from the 26th column position to the 27th column position.

In both the program (or macro) for forming a survey sheet based on data in the DB 21 and the program (or macro) for loading data from a survey sheet in which answers are written and storing the data in the DB 21, therefore, the data write and read positions must be changed. That is, a program (or macro) for a survey sheet in a given format without "zinc compound" and a program (or macro) for a survey sheet in new format with "zinc compound" must be separately prepared unless a program (or macro) is created in consideration of the above situation. When answers based on the two formats are present at once, the data must be processed by using programs (or macros) corresponding to the respective formats.

For the above reason, in a survey sheet in which company-specific and parts-specific survey items and answer contents are laid out in the form of a table, an item with high possibility of alteration, addition, and omission of contents is located at the end of the list. With this arrangement, only simple processing is required when a survey sheet is formed on the basis of data in the green procurement database (DB) 21 or answer contents are loaded from a table on a survey sheet having items laid out at the above column positions, and the data is stored in the green procurement database (DB) 21. Even if, for example, data is added to an item with high possibility of alteration, addition, and omission of contents, since this change occurs at the end of the layout, the change exerts no influence on the overall layout. Since the column positions of survey items located before the above item need not be changed at all, there is basically no need to change the program (or macro) for forming a survey sheet based on data in the DB 21 and the program (or macro) for loading data from a survey sheet in which answers are written and storing the data in the DB 21. This is a great merit.

In this embodiment, in forming a green procurement database, in order to minimize data input operation, the operator stores parts supplier-specific parts data in the green procurement database 21 by using data in a database in, for example, the material procurement department for managing parts for the manufacture of products and material procurement, and forms a survey sheet by listing survey items on the basis of the stored parts data. Word processing software and spreadsheet software are installed as standard in most computers, e.g., general-purpose personal computers, and can be immediately used at the time of purchase. It can be taken for grated that a company or individual who has purchased a general-purpose personal computer has already been in an environment in which he/she can use such word processing software or spreadsheet software. For this reason, any parts supplier can enter data in a survey sheet, through a portable recording medium in which the data file of the survey sheet is stored, by using spreadsheet software.

A survey sheet is a questionnaire, and hence must be written in a format that facilitates writing of answers to questions and totaling the answers. A tabular form is the optimal format for this purpose. As a questionnaire in the present invention, therefore, a survey sheet created in a tabular form by using spreadsheet software is used.

According to the present invention, since spreadsheet software can be used, a survey sheet can be formed by loading data registered in a database. In addition, the data of a survey sheet in which answers are written can be easily stored in a database by computer processing. This makes it possible to minimize manual operation.

In addition, the versatility of files can be improved by exchanging data through files formed by spreadsheet software or electronic file in CSV.

In addition, since the present invention uses spreadsheet software, even a small-scale material seller can easily input data. Even if not all answers to procurement parts,to be surveyed are received from a material seller, no inconvenience occurs, and a re-survey can be conducted on portions to which no answers have been received. Window scrolling required when diverse survey items are laid out in a tabular form can be facilitated. Furthermore, it is easy to recognize an item with great importance or an item with little importance among diverse survey items.

According to the first embodiment described above, a data file of a survey sheet designed to allow environment consideration condition information in a document format based on general-purpose spreadsheet software to be input for each business contact is formed by operating a computer or utility software for managing a green procurement database. This data file is stored in a portable recording medium such as a flexible disk. The recording medium is sent to a corresponding business contact. On the business contact side, an operator sets the portable recording medium in a personal computer in his/her office, and opens the survey sheet stored in the portable recording medium by using general-purpose spreadsheet software. The operator then enters answers to necessary items associated with environment consideration conditions. The survey sheet to which the answer contents are added is stored in the portable recording medium, thus obtaining a portable recording medium on which data obtained by additionally entering environment consideration condition information is recorded. This recording medium is sent back to the buyer as the survey source. The buyer as the survey source receives the recording medium and stores the recorded information in the green procurement database 21 by operating the computer 22 (or another computer having utility software), thus reflecting the answer contents in the database. With this operation, the survey can be completed with minimum manual operation.

In this case, as a feasible method, the method of exchanging data through a portable recording medium such as a flexible disk has been described, although the recording medium must be transported. However, other types of electronic data media may be used. The use of the Internet has recently been popularized. Obviously, therefore, data can be easily exchanged by using electronic mail upon attaching a file to the mail. In addition, data can be exchanged by using an FTP (File Transfer Protocol) server.

Assume that a given buyer wants to do business with parts suppliers and material suppliers in a foreign country. In this case, in order to obtain environment consideration condition information about parts and materials in the parts and material suppliers, the use of the Internet is very practical and effective. In such a case, it is most preferable that the WWW (World Wide Web) be used, although electronic mail may be used.

In the second embodiment, a case wherein the Internet Web is used will be described.

Since the arrangement of the second embodiment shown in FIG. 9 is basically the same as that shown in FIG. 1, the same reference numerals as in FIG. 1 denote the same parts in FIG. 9, and a detailed description thereof will be omitted. The arrangement in FIG. 9 differs from that in FIG. 1 in that a Web server 23 is prepared to allow the use of a green procurement database 21. A general-purpose computer (e.g., personal computer) 30 that is connected or can be connected to the Internet is installed in a business contact, and the computer 30 has a Web browser 33 and can access the Web server 23.

In this case, the Web server 23 can provide a client with still pictures, motion pictures, speech, and the like by using the HTTP (HyperText Transfer Protocol). The Web browser 33 is used to display information received from the Web server 23. The World Wide Web is a client-server system service. The Web server 23 provides a client (Web browser) with still pictures, motion pictures, speech, and the like by using the HTTP (HyperText Transfer Protocol), i.e., a protocol used for transferring hypertext information between a WWW client and a WWW server in the World Wide Web (WWW) service.

The Web server 23 has the function of executing programs through a CGI (Common Gateway Interface) as well as providing various information.

This system having the above arrangement forms an electronic file 12 in CSV (Comma Separated Value) by extracting and processing necessary data from a database 11 held by the material procurement department, and stores the file in the green procurement database 21. With this operation, this system registers data about business contacts as survey targets and material items (e.g., parts, material, and raw material items) in the database.

Data of parts, materials, raw materials, and the like for each product, and information about the corresponding parts/material makers and suppliers, which are basic data for green procurement, are acquired in advance from the database 11 held by the material procurement department.

The database 11 held by the material procurement department stores data of parts, materials, raw materials, and the like required for each product designed by the design department, and information about the parts/material makers or suppliers in order to procure parts, materials, and the like required to manufacture each product in the manufacturing department. These pieces of information are used as basic data. Note that the material procurement department mainly serves to order/manage materials, and hence does not hold environmental load information of the materials.

Basic information (material names and supplier names) for creating a database of information for green procurement is acquired from the database 11 held by the material procurement department. For this purpose, the operator accesses the database 11 through the computer 10 for managing the database 11 to extract necessary data about materials (parts, materials, raw materials, and the like to be used) of each product, supplier names, and the like, create CSV (Comma Separated Value) data, and store it, thereby creating the CSV electronic file 12.

The data file 12 obtained by converting these data into CSV data is stored in a portable recording medium. This medium is transported to a computer 22 connected to the green procurement database 21 in the system of the present invention and set in the drive unit. The data file 12 is loaded into the computer 22. The computer 22 then edits and processes the contents of the loaded data by using spreadsheet software to form a tabular survey sheet having desired contents for a questionnaire.

That is, the data of parts and materials for one product and the data of the suppliers of the parts and materials are stored in the data file 12 in CSV. Therefore, the data file 12 is loaded into the computer 22, and the loaded data are classified according to the suppliers to create a database. As a consequence, parts data are stored in the green procurement database 21 in correspondence with the suppliers. The user operates the computer 22 to list survey items on the basis of the above data, thereby forming a survey sheet listing the parts classified by supplier and desired survey items related to the parts. Since survey items must be assumed to vary depending on the target parts and materials, the user selects optimal survey items like "item 1", "item 2", "item 3", "item 4", "item 5", . . . , "item $\underline{n}$" for each product, as indicated by symbol "21a" in FIG. 2, and input them as information in advance. This product-specific survey item data is stored in the green procurement database 21. With this operation, the user can search the green procurement database 21 for the data of a target part by using a parts name and parts code as keys, retrieve the contents of various survey items associated with the part, and extract the data.

According to the system of the present invention, a desired survey sheet is formed by using data in the green procurement database 21, and the sheet is given to a parts supplier. The parts supplier is then asked to enter answers in blank answer columns. This survey sheet is formed for the corresponding supplier by using spreadsheet software on the computer 22.

This survey sheet is registered in the Web server 23 automatically or manually. In this case, the Web server 23 provides programs for various mechanisms for supporting inputs and instructions when a client opens and uses the survey sheet.

At the business contact side, an operator connects the computer 30 to the Web server 23 through the Internet, and accesses the Web server 23 by using the Web browser 33 installed in the computer 30. The operator then enters necessary items associated with environment consideration conditions in accordance with instructions displayed in a window.

The data sent to the Web server 23 in this manner is reflected in the survey sheet, and is automatically or manually reflected in the green procurement database 21, thus completing the survey.

Although a simple arrangement has been described above, if importance is to be attached to security, a firewall may be installed midway along the electronic data transfer path. Alternatively, other auxiliary servers may be added, as needed.

Note that a technique of exchanging survey sheets (survey documents) by using electronic mail can be used, in addition to the techniques of exchanging survey sheets through recording media and web servers.

The differences in effect between the technique of the first and second embodiments and the conventional technique will be described below. FIG. 9 is a view for explaining the differences between the two techniques in detail. As is obvious from FIG. 9, the time taken for "survey document preparation" per 1,000 companies is 1,000 min in the conventional technique, which is reduced in half to 500 min in the technique of the present invention. According to the conventional technique, it takes about five days for "survey document delivery" because sellers are sent for at scheduled times and survey documents are handed to them. In contrast to this, according to the technique of the present invention, since survey document can be delivered through Web servers or electronic mail, it takes about 50 min per 1,000 companies for this task. With regard to "data input by sellers", in the conventional technique, since some seller has as many as several thousand supplies, it takes about 10 days to enter the corresponding data by handwriting. In the technique of the present invention, this task can be done by copying extracted data, and hence it takes only about 30 min to enter the data. With regard to "answer table", in the conventional technique, answer tables are handed to the buyer, it takes about one day for this task. In the technique of the present invention, since answer tables can be transferred by electronic mail, it takes about several seconds to complete the task. According to the conventional technique, in converting "answer document" into electronic data, information must be transcribed from sheets of paper. For a product made up of about 100,000 parts, it takes about 3,000,000 sec=833 hrs for this task, provided that about 600,000 types of input operations are required, and 5 sec are required for one type. In contrast to this, according to the technique of the present invention, since answer documents are received in the form of data files, it practically takes no time for input operation.

As described above, the technique of the present invention can considerably save labor and time and contributes to a great reduction in cost.

The third embodiment of the present invention will be described next with reference to FIG. 10. This embodiment has both the functions of the first and second embodiments. As shown in FIG. 10, the third embodiment has a parallel combination of the arrangements of the first and second embodiments.

The flows of data in the third embodiment are the same as those in the first and second embodiments. The third embodiment can use either the technique of the first embodiment or the technique of the second embodiment. The business contact may therefore selectively use the techniques in accordance with the information processing equipment held by the business contact or the number of material items to be entered.

FIG. 11 shows an example of the window arrangement of a spreadsheet software input format in the third embodiment. With general-purpose spreadsheet software, the user can arbitrarily design an input window. With concurrent use of macro functions, programs, and the like, the user can operate buttons laid out in a window, move a mouse cursor into a table, and execute character input operation or edition at the position of the cursor.

In this embodiment, the user forms an easy-to-input window by fully using these functions, and uses the window. More specifically, the user starts a macro or program describing a procedure for displaying a drop-down list in accordance with an instruction from the user, making the user to select a target item, and immediately displaying a data portion associated with the item.

Upon execution of this macro or program, for example, an input window including a window constituent element 41, a table, and operation buttons is displayed. The window constituent element 41 includes an elongated window and drop-down list display button. When the user clicks this button, a list of input target candidates, e.g., "mass", "environment-related substance", "recyclability", and "use of recycled material", is displayed. When the user clicks a desired candidate, a table portion corresponding to the selected input target portion is displayed in the window.

In the lower area of the window, various operation buttons, e.g., "copy rows", "paste rows", "delete rows", "save", "print", "cancel", "check", and "help", are displayed. When the user clicks a desired button, the corresponding function can be used.

When the user operates the window constituent element 41 to select, for example, "recycled material", the table is scrolled to display survey items associated with recycled materials. When the user selects "environment-related substance", the table is scrolled to display survey items associated with environment-related substances. In this manner, the table is quickly scrolled to a table portion corresponding to a selected item to allow the user to quickly enter answers in the table. Even with a large table, the work to be done by the user can be minimized by simplifying the operation of searching for an input field and moving the cursor to the input field. This allows the operator to easily and quickly input environment consideration condition information regardless of diverse survey items.

The color of the item "recycled material" of the window constituent element 41, which starts the program describing the procedure for displaying a drop-down list in accordance with an instruction from the user, making the user select an item, and quickly displaying a data portion associated with the selected item, is the same as the color of survey item columns associated with recycled materials in the table. For example, the color of these portions is set to red. With this setting, the operator can easily recognize this item as an especially important item, and can also recognize at a glance that the table is properly scrolled.

Proper color setting for the window makes it easy to recognize an item with great importance or an item with little importance among diverse survey items. In this case, even if an item with the greatest importance is displayed in green or blue, other than red, which are colors of the three primary colors, since these colors are as visually recognizable and noticeable as red, the operator can easily recognize the item.

An item with the greatest importance may be displayed by using one of cyan, magenta, and yellow which are obtained by mixing two of the primary colors red, green, and blue, which are the unit colors of a display apparatus (color display apparatus). In this case, since the item can be displayed by using a color with the highest luminance, other than a color close to white, the item becomes prominent and recognizable.

Referring to FIG. 11, the operator enters "yes" in a column 51 in which environment consideration necessity is to be entered. In this case, although "yes" is entered, no information is entered in a column 52 in which a numerical value representing the degree of environment consideration necessity is to be entered. This case lacks data consistency.

In this case, the operator gives a check start instruction by clicking a check button 53 serving as a button for starting a program or macro for checking consistency between the entered information indicating environment consideration necessity and the entered information indicating a numerical value expressing the degree of environment consideration necessity. With this operation, the operator can check consistency by starting the program or macro for checking the consistency. When this check is done, the computer displays a message indicating the lack of consistency between the contents of the column 51, in which environment consideration necessity is to be entered, and the contents of the column 52, in which a numerical value representing the degree of environment consideration necessity is to be entered, thereby prompting correction.

FIG. 12 shows an example of the window arrangement of a spreadsheet software input format. Referring to FIG. 12, survey items are laid out along the abscissa; and material items, along the ordinate. This layout makes it possible to perform display and input operations by effectively using the window range.

In this case, even if the number of material items is small, a table is displayed in a landscape format. For this reason, a scroll bar 61 for scrolling the window in the landscape format is set on a side of the table.

The preparation of a delete button 74 for deleting material item data, a copy button 72 for copying data in an environment consideration condition input item, and the like allows the operator to easily and quickly input data without imposing much load on the operator even in a case wherein similar input operation must be repeated.

In addition, a start button 81 is prepared to start a program or macro describing a procedure for printing a document including input environment consideration condition information and a seal column (signature column) in which a person in charge of checking the input data is to put his/her seal (signature). By using this button, the operator can print a desired document without much trouble.

FIG. 13 shows an example of a document with a signature column according to the third embodiment of the present invention.

In this example, a signature column 91 is prepared to make a person in charge of checking input data put his/her seal. Upon completion of answering operation, a person in charge of checking the answers puts his/her seal in this column, thereby completing the survey answer constituted by the electronic data and the document. This makes it possible to clarify that the person in charge of checking the input data is not responsible for falsification of the electronic data.

As described above, with the program or macro describing the procedure for printing a document including environment consideration condition information and a signature column in which a person in charge of checking the input data is to be put his/her seal, the person in charge of checking the input data needs to put his/her seal on the document printed from the electronic data upon confirming that there is no error. This makes it possible to clarify the range of responsibility.

With the spread of the Internet, an environment for electronic mail has been prepared. As a consequence, daily communication between individuals is commonly performed by using convenient electronic mail. In addition, electronic mail communication is data communication, and hence makes it possible to transmit a supplier-specific survey sheet to the supplier-side operator in charge of answering the survey, upon attaching the survey sheet as data to mail, make the operator open the mail, enter necessary data in the survey sheet portion, return the answer-entered survey sheet to the survey source, and store, on the survey source, the data of the survey sheet attached to the return mail in a database upon loading the data from the survey sheet.

Each individual has a unique electronic mail address, and can set a password to prevent others from peeping the mail. By using such electronic mail that can be transmitted to an individual, survey sheets can be easily exchanged without exposing them to an unspecified number of people. Although information can be easily acquired by exchanging survey sheets using this electronic mail, since perfect security cannot be provided, there is always a chance of disguise or data falsification.

An authentication method of easily checking disguise or falsification in exchanging survey sheets by using electronic mail will be described next as the fourth embodiment.

The following is the concept of the fourth embodiment. First, electronic mail in which necessary items are written is transmitted to an individual. The individual who has received the mail then enters necessary items in the electronic mail and returns it to a mail address designated by the transmission source. On the transmission side, this mail is further transmitted to another individual to make him/her check the contents and return the mail to the mail address designated by the transmission source. The first transmission destination is a supplier-side operator, i.e., an operator in charge of inputting data at the business contact, whereas the second transmission destination is a responsible person, e.g., a person superior to the supplier-side operator in charge of inputting data.

This embodiment uses a scheme of transmitting mail upon attaching mail contents thereto. In this scheme, the survey source asks a person on the supplier side to check the mail contents and transmit it as return mail, and uses the checked contents as the contents of the survey sheet in the end.

In this system, a survey source asks a supplier-side operator in charge of inputting data to answer survey contents by using electronic mail and attach the answer contents to the electronic mail, and also asks a person superior to the supplier-side operator to check the contents of the return mail, thereby preventing data falsification or disguise. Although perfect security cannot be expected, the system can greatly reduce troubles associated with answer contents because checks on the answer contents by responsible persons on the supplier side are not performed at once but are performed in different routes.

Figure 14:
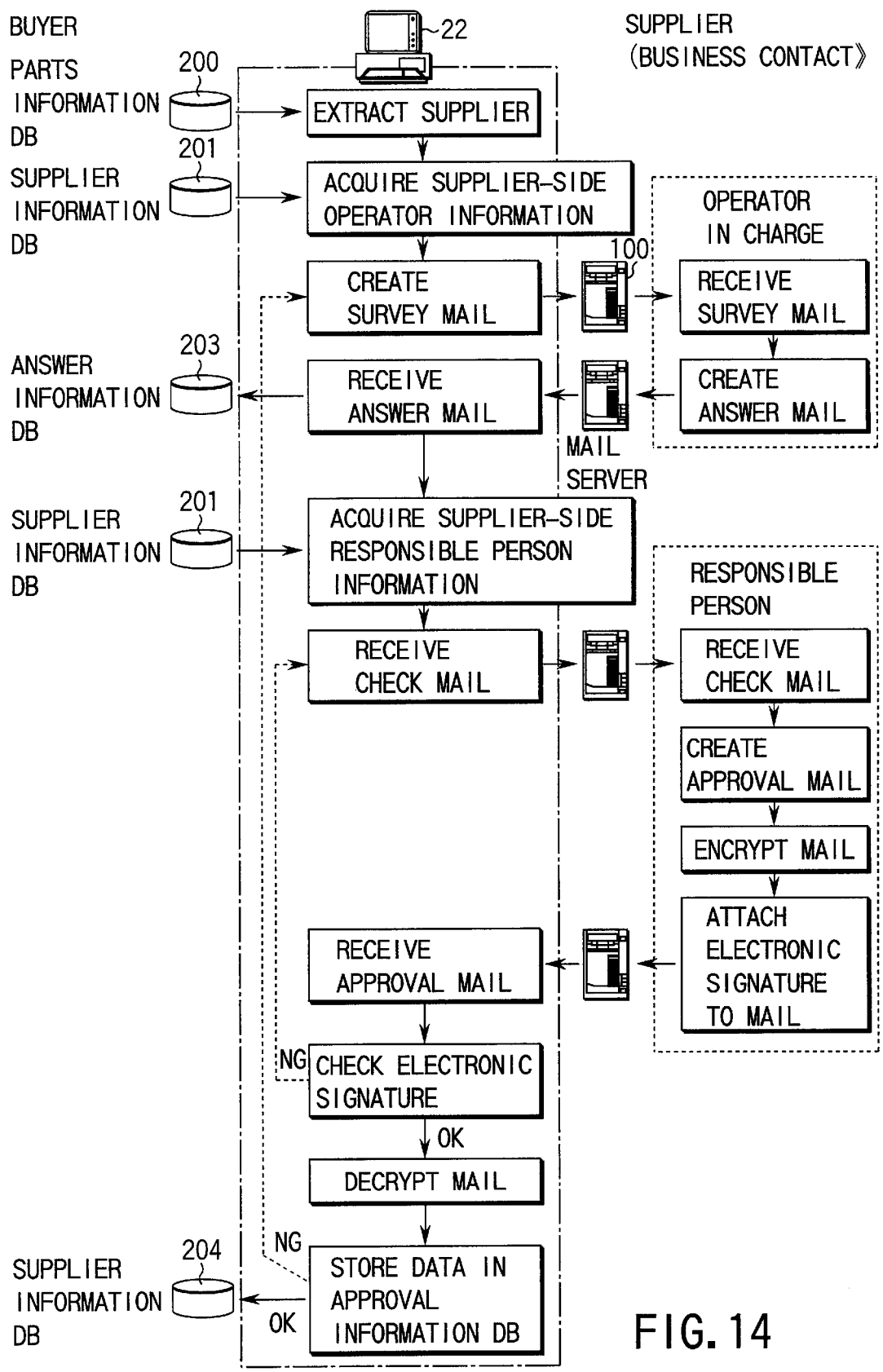
FIG. 14 is a schematic view showing a data flow according to the fourth embodiment of the present invention.

The fourth embodiment will be described in detail with reference to FIG. 14.

In this embodiment, a buyer that conducts a survey (i.e., a manufacturer that procures parts and the like and manufactures a product: a survey source) uses electronic mail to ask a parts supplier (i.e., a business contact: information source) to provide information about parts to be supplied.

A system according to the present invention uses a mail server 100 connected to a communication network. The mail server 100 has the function of storing answer mail received from a parts supplier through the communication network in an answer information DB (answer information database) 203 and automatically processing the mail to allow answer contents to be always retrieved.

In this case, the mail server 100 serves as an answer information receiving section, electronic mail transmitting section, and electronic mail receiving section at once. The answer information DB 203 as a database for storing answer information obtained by the answer information receiving section serves as an answer information storage section. An approval information DB (approval information database) 204 as a database for storing approval information of a person on the parts supplier side who is responsible for the contents answered in electronic mail serves as an approval information storage section.

In this embodiment, as a material DB (material database) 11 in a material system or a green procurement DB (green procurement database) 21 in a green procurement system, a supplier information DB (supplier information database) 201 is prepared.

The supplier information DB 201 is a database for storing parts supplier information (supplier information). As shown in FIG. 16, supplier information is constituted by item contents, e.g., "supplier name", "operator's department", "name of operator", "post of operator", "mail address of operator", "responsible person's department", "name of responsible person", "post of responsible person", "mail address of responsible person", and "public key of responsible person".

FIG. 17 shows registered contents in detail. In this case, item contents are registered such that in the case of ΔΔ electric corporation, for example, "MKA002" is registered as "supplier code"; "material department", as "operator's department"; and "Jiro Jinnai", as "name of operator".

A computer (personal computer) 22 at the survey source has a mail/data processing application having a survey mail processing function, check mail processing function, approval mail processing function, and the like as well as the general function of creating, transmitting, receiving, and discarding mail.

Of these functions, the survey mail processing function is the function of acquiring a part as a survey target and the supplier code of the supplier of the part by using a parts information DB 200, and loading a parts code and the supplier code of the supplier upon designation of the target part with a cursor among parts displayed as a list. Thereafter, "supplier name", "operator's department", "name of operator", "post of operator", and "mail address of operator" are acquired from the supplier information DB 201 constituted by records with the data arrangement shown in FIGS. 16 and 17 by using the acquired supplier code as a search key. The acquired information is embedded at the target item position in the created mail. With this process, a mail text in which information such as an answer request text, the contents of survey answer targets, and a mail return method are embedded is created and transmitted.

The check mail processing function has the function of acquiring a supplier code from answer mail designated by the operator, and also acquiring the responsible person's department, the name of the responsible person, the post of the responsible person, and the mail address of the responsible person by accessing the supplier information DB 201 using the acquired supplier code as a search key. That is, the check mail processing function has the function of acquiring the transmission source information of answer mail designated by an operator at the survey source by searching the answer information DB 203 for the answer mail, acquiring a supplier code from the information, and acquiring a responsible person's department, the name of the responsible person, the post of the responsible person, and the mail address of the responsible person by accessing the supplier information DB 201 using the acquired supplier code as a search key. The check mail processing function also has the function of embedding information such as an address, addressee, and sender at predetermined positions on the basis of the acquired information, creating a mail text in which information such as an approval request text, survey answer information in the form of answer mail, and a mail return method, is embedded, and transmitting the mail text.

The approval mail processing function serves to automatically process the approval mail (encrypted by using a cipher key (secret key) of the survey source which is notified to the parts supplier in advance, and a cipher key (public key) of the responsible person on the parts supplier side, and having an electronic signature) and store the result in the approval information DB (database) 204. More specifically, the received approval mail is downloaded from the mail server 100, and the cipher key of the responsible person is acquired from the supplier information DB 201 on the basis of the supplier code contained in the approval mail. The mail is then decoded by using the obtained cipher key. That is, the mail is decrypted to reconstruct the electronic signature. At the same time, the reconstructed electronic signature of the approval mail is checked to confirm that the mail is transmitted from the responsible person on the supplier side. If the mail is confirmed, the contents of the mail are decrypted by using the cipher key of the survey source and the cipher key of the responsible person on the supplier side. In addition, if it is confirmed that the contents are not falsified, the survey source operator performs confirming operation and stores corresponding information in the approval information DB 204.

In this system having the above arrangement, first of all, a survey source operator operates his/her personal computer to start the mail/data processing application to operate the check mail processing function so as to search the parts information DB 200, in which records with the data arrangement constituted by "parts code" and "supplier code" are stored, by using the parts code of a target part. With this operation, the supplier code of a parts supplier who supplies the part as the survey target.

This mail/data processing application is designed to acquire a part as a survey target and the supplier code of the supplier of the part by using the parts information DB 200. When the operator designates the target part, with the cursor, among parts displayed as a list, the parts code and the supplier code of the supplier are acquired.

The check mail processing function of the mail/data processing application serves to acquire "name of supplier", "operator's department", "name of operator", "post of operator", and mail address of operator" from the supplier information DB 201 constituted by records with the data arrangement shown in FIGS. 16 and 17 by using the supplier code obtained in this manner as a search key. The acquired information is reflected at the target item position in the created mail.

FIG. 18 shows an example of survey mail. This example is made up of a subject, destination address, source address, and mail contents, and more specifically, the following items: a subject "Subject:", destination "To:", source "From:", answer return address "Reply-To:", addressee (name of operator in charge with post), mail text, and survey item answer column. A fixed mail format is used. This system uses a program for automatically inserting the above obtained items in corresponding item positions to be reflected in the mail.

When, therefore, the operator selects parts code "NJ00100" and supplier code "MKA001", necessary items are inserted in the mail such that the mail is addressed to Taro Tanaka, the chief of the material department in ∘∘ factory.

A mail text may be written for each operation. In order to improve efficiency, however, stereotyped expressions may be prepared to allow the operator to select/retrieve an optimal expression for a purpose and insert it. Alternatively, a processing form may be used, in which a template is prepared, and pieces of information retrieved from the above database are automatically inserted in accordance with different necessary items.

As a consequence, as shown in FIG. 18, a text constituted by a subject, destination address, source address, and mail contents is automatically created. More specifically, this text includes requirement contents such as a mail text "With regard to the survey of which we have informed you, we have completed preparations, so let us start the survey with this mail." addressed to Taro Tanaka, the chief of the material department in ∘∘ factory, and the destination address "autosystem@ chousa.batsibatsu.co.jp" of the answer mail. In addition, in the text, the code names of parts supplied from ∘∘ factory and a survey answer item, "mass" in this case, as survey content items, are written. These data are arranged to allow an operator to enter the masses of the parts in units of [g] in correspondence with the code names of the parts.

When such survey mail is transmitted, the addressee corresponding to the mail address receives the mail by using a mail application in his/her personal computer, and reads the mail contents on the screen of the computer 22. In this case, the mail application used on the parts supplier side as the information provider may be general-purpose software.

The parts supplier-side operator who has received this mail, Taro Tanaka, the chief of the material department in ∘∘ factory in this case, creates answer mail on the personal computer in accordance with answer guidance described in the mail text, and transmits it to a mail address for the reception of answer mail, which is prepared by the buyer (survey source) as a survey side.

The answer mail received by the mail server 100 is automatically processed by the mail server 100, and the answer contents are stored first in the answer information DB 203.

At the survey source, the responsible person's department, the name of the responsible person, the post of the responsible person, and the mail address of the responsible person are acquired from the supplier information DB 201 on the basis of the supplier code contained in the answer mail. This operation can be executed by the check mail processing function of the mail/data processing application installed in the personal computer at the survey source. The check mail processing function serves to acquire the supplier code from the answer mail designated by the supplier-side operator in charge and acquire the responsible person's department, the name of the responsible person, the post of the responsible person, and the mail address of the responsible person by accessing the supplier information DB 201 by using the acquired supplier code as a search key. The operator then creates check mail containing an approval request text and survey answer contents on the basis of the acquired information, and transmits the mail.

FIG. 19 shows an example of check mail. This check mail contains a text for asking for approval for the answer contents described by Taro Tanaka, the chief of the material department in ∘∘ factory, stating "With regard to the survey of which we have informed you, we have received the following answers from Mr. Taro Tanaka, the chief of the material department. We now ask you to check the contents and send approval mail to us.". More specifically, the above text, answer guidance, and answer contents from Tanaka, the chief, are embedded in the check mail.

When such check mail is transmitted from the survey source, the addressee corresponding to the mail address receives the mail by using the mail application installed in his/her personal computer, and reads the mail contents on the screen of the personal computer. In this case, the mail application used on the parts supplier side may be general-purpose mail software.

A responsible person on the parts supplier side who has received this mail, Goro Goto, the manager of the material department in ∘∘ factory who is superior to Taro Tanaka, creates approval mail on the personal computer in accordance with the check guidance described in the mail text, and transmits the mail to a mail address for the reception of approval mail which is prepared by the buyer as the survey side.

Upon reception of the check mail, the responsible person on the parts supplier side creates approval mail in accordance with the check guidance, and encrypts the mail by using a cipher key of the survey source which is informed to the parts supplier in advance and a cipher key of the parts supplier. The person also attaches his/her electronic signature to the mail and transmits the mail to the mail address for the reception of approval mail which is prepared by the survey source as a survey side upon encrypting it. With this operation, the approval mail is sent to a mail box in the mail server 100 which corresponds to the mail address for the reception of approval mail, and is stored therein.

A processing system (an application in the personal computer at the survey source) automatically processes the approval mail received by the mail server 100, and acquires first the cipher key of the responsible person by searching the supplier information DB 201 on the basis of the supplier code contained in the approval mail. This system then decrypts the approval mail by using the obtained cipher key, and checks the electronic signature of the approval mail to confirm that the mail was really transmitted from the responsible person on the supplier side.

Subsequently, the system decrypts the contents of the approval mail by using the cipher key of the survey source itself and the cipher key of the responsible person on the parts supplier side, and checks whether the contents have not been falsified. If it is confirmed that the answer contents are not falsified, corresponding information is stored in the approval information DB 204.

If the electronic signature on the approval mail is not appropriate or cannot be properly decrypted, the flow of processing returns to the step of transmitting approval mail to perform a re-check upon attaching information indicating the improper state to the mail. If the approval mail is appropriate but the approval information indicates a rejection, it is determined that the answer contents are not appropriate, and the system instructs the survey source operator in charge to conduct a survey again. The operator knows this on the screen of the computer 22, and returns to the step of transmitting survey mail to conduct a re-survey upon attaching information indicating the rejection of the answer contents by the responsible person to the mail.

The above embodiment performs a survey by using electronic mail. However, the present invention is not limited to this. For example, the WWW may be used to create a form for displaying survey contents on a Web page, and a parts supplier-side operator in charge may answer the survey by using a Web browser. In this case, the destination of answer data for the form may be set to the answer mail reception address of the buyer (survey source). If the step of decrypting form data is added, subsequent processing can be performed in the same manner as described above.

In the fourth embodiment, encryption processing is executed by using a public key cryptosystem. However, the present invention is not limited to this. Another type of cryptosystem may be used, or encryption and an electronic signature may not be required if security is not particularly required. In contrast to this, if importance is given to security, both survey mail and answer mail may be encrypted and electrically signed. In addition, in the embodiment, part of the processing is automated. However, the present invention is not limited to this. Operators may manually process the above operations, or processing that is not explicitly written as automatic processing may be automated.

This technique of the fourth embodiment can be widely used as a simple approval method and authentication method between companies that have already established mutual credibility.

According to the fourth embodiment, electronic mail describing necessary items as information acquisition targets and a return address is transmitted to an individual at an information provider. Upon reception of return mail in which the necessary items requested by the electronic mail are entered and which is returned to the return address from the receiving side, the operator at the survey source transfers the entered contents of the return mail and the return address information to the responsible person at the information provider. When contents-approved return mail is received from the responsible person, the information from the information provider is accepted. In addition, the contents-approved return mail from the responsible person at the information provider is received at the return address after the mail is electronically signed by the responsible person and encrypted by using cipher keys (public and secret keys) set individually in advance. The encrypted mail is decrypted by cipher keys, and the electronic signature is authenticated. If the contents of the mail have been approved, the information of the return mail from the information provider is accepted.

According to the fourth embodiment, the contents of items about which information is required are transmitted to an information provider side (parts supplier side) by using electronic mail, and answer contents are transmitted to a responsible person on the answering side by electronic mail to receive approval from the responsible person. If electronic mail containing approval information, and approval is confirmed, the answer contents from the information provider side are stored in the information storage section. This system can be implemented as long as an answering side has an electronic mail client. In addition, a procedure for obtaining approval from a responsible person can be implemented. More specifically, a procedure for requesting answers from a corporation, organization, or department having no workflow system and obtaining approval from a responsible person on the answering side can be implemented. Therefore, answer sides can be selected from a wide range of choices, and answer contents can be verified. This makes it possible to greatly improve the reliability of a database storing answer results.

Various embodiments of the present invention have been described above. However, the present invention is not limited to the above embodiments, and the embodiments can be variously modified. Obviously, the techniques described as the embodiments can be applied, as programs that can be executed by computers, to a scheme of distributing the programs through recording media such as magnetic disks (floppy disks, hard disks, and the like), optical disks (CD-ROMs, DVDs, and the like), and semiconductor memories, and a scheme of distributing the programs by communication on a communication network such as the Internet.

As has been described above, according to the present invention, the above programs can be seamlessly executed from a large-scale information processing system capable of managing/using many procurement data in a buyer to a simple electronic data processing system which allows even a small-size material seller to easily input data. In contrast to this, the above programs can be seamlessly executed from a simple electronic data processing system which allows even a small-size material seller to easily input data to a large-scale information processing system capable of managing/using many procurement data in a buyer.

In addition, according to the present invention, even a small-scale material seller can easily input data.

Even if not all answers to procurement parts to be surveyed are received from a material supplier, no inconvenience occurs, and a re-survey can be conducted on portions to which no answers have been received.

Window scrolling required when diverse survey items are laid out in a tabular form can be facilitated. In addition, according to the present invention, it is easy to recognize an item with great importance or an item with little importance among diverse survey items.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of generating environment performance assessment information, comprising:
preparing, by a product maker, a respective survey table dedicated to each of a plurality of parts suppliers based on data read from a database, each survey table having a list of supplier-specific parts and survey items associated with the parts;

providing each survey table to each respective parts supplier to have each supplier fill in cells of the respective survey table with environmental data on environmental loads of the survey items to acquire a data-filled survey table;

extracting, by the product maker, the environmental data from each data-filled survey table;

generating tabular data having a structure that allows various pieces of environment performance assessment information about the extracted environmental data to be input, using general-purpose spreadsheet software, by the product maker; and reflecting the tabular data in the database to generate environment performance assessment information.

2. A method according to claim 1, wherein the tabular data includes a hypertext document that is accessible by a Web browser.

3. A method according to claim 1, wherein generating the tabular data comprises:

selecting one of a document format of general-purpose spreadsheet software and a hypertext document that is accessible by a Web browser;

arranging the survey items in a tabular form of landscape orientation when the document format of the general-purpose spreadsheet software is selected; and arranging the survey items in a tabular form in portrait orientation when the hypertext document that is accessible by the Web browser is selected.

4. A method according to claim 1, wherein providing the survey table includes storing the survey table in a portable recording medium and providing the supplier with the recording medium to have the supplier fill in cells of the survey table with the environmental data.

5. A method according to claim 4, further comprising:

receiving the recording medium storing the environmental data; and reading out the environmental data from the recording medium.

6. A method according to claim 1, wherein providing the survey table comprises:

providing the supplier the survey table through a communication interface to have the supplier fill in cells of the survey table with the environmental data.

7. A method according to claim 6, wherein extracting the environmental data includes receiving the survey table filled with the environmental data from the supplier through the communication interface.

8. A method according to claim 1, wherein generating the tabular data comprises:

generating tabular data about the extracted data in accordance with a comma separated value (CSV) file format.

9. A method according to claim 1, wherein generating the tabular data comprises:

editing data on material items of the parts and data of the supplier in accordance with the CSV file format; and generating the tabular data having a list of the material items and desired survey items associated with the material items.

10. A method according to claim 9, wherein providing the survey table comprises:

storing the survey table in a portable recording medium; and providing the supplier with the recording medium to have the supplier fill in the survey table with the environmental data.

11. A method according to claim 10, wherein extracting the environmental data comprises:

receiving the recording medium storing the environmental data; and reading out the environmental data from the recording medium.

12. A method according to claim 9, wherein providing the survey table comprises:

providing the supplier with the survey table through a communication interface to have the supplier fill in cells of the survey table with the environmental data.

13. A method according to claim 12, wherein extracting the environmental data comprises:

receiving the environmental data from the supplier through the communication interface.

14. An environment performance assessment information generation system for generating environment performance assessment information based on environmental data provided by a plurality of suppliers, the system comprising:

a database configured to store data of material items used to manufacture a product, together with supplier information corresponding to the material items;

a survey table generator configured to generate a survey table based on the data of the material items and supplier information that are read out from the database, the survey table having a list of material items and survey items associated with the material items;

a media configured to provide the survey table for each of the suppliers to have each of the suppliers fill in cells of the survey table with the environmental data according to the survey items; and a tabular data processor configured to extract the environmental data from the survey table filled with the environmental data, and to generate tabular data for each of the suppliers by using general-purpose spreadsheet software, the tabular data having a structure that allows environment performance assessment information about the extracted data to be input, the tabular data processor reflecting the tabular data in the database to generate environment performance assessment information.

15. A system according to claim 14, wherein the tabular data processor is configured to generate the tubular data having selectively one of a document format of general-purpose spreadsheet software and a hypertext document that is accessible by a Web browser, the tubular data including survey items arranged in a tabular form of landscape orientation when the document format of the general-purpose spreadsheet software is selected, and arranged in a tabular form in portrait orientation when the hypertext document that is accessible by the Web browser is selected.

16. A program stored in a computer readable medium for generating environment performance assessment information based on environmental data provided by a plurality of suppliers, the program comprising:

instructions for causing the a computer to extract material item data for each of the plurality of suppliers from a database storing data of material items used to manufacture a product, together with supplier information corresponding to the material items;

instructions for causing the computer to generate tabular data having a structure that allows environment performance assessment information about the extracted data to be input, by using general-purpose spreadsheet software; and instructions for causing the computer to reflect the tabular data in the database to generate environment performance assessment information.

* * * * *